US011327608B2

(12) United States Patent
Ahmed et al.

(10) Patent No.: US 11,327,608 B2
(45) Date of Patent: May 10, 2022

(54) TWO CAMERA TOUCH OPERATION DETECTION METHOD, DEVICE, AND SYSTEM

(71) Applicant: SEIKO EPSON CORPORATION, Tokyo (JP)

(72) Inventors: Mirza Tahir Ahmed, Vaughan (CA); Yang Yang, Richmond Hill (CA)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 17/177,297

(22) Filed: Feb. 17, 2021

(65) Prior Publication Data

US 2021/0294456 A1  Sep. 23, 2021

(30) Foreign Application Priority Data

Feb. 17, 2020 (JP) .............................. JP2020-024062

(51) Int. Cl.
*G06F 3/042* (2006.01)

(52) U.S. Cl.
CPC .................................. *G06F 3/0425* (2013.01)

(58) Field of Classification Search
None
See application file for complete search history.

(56) References Cited

U.S. PATENT DOCUMENTS 9,710,109 B2 *  7/2017  Suzuki .................. G06F 3/0426
2001/0028341 A1  10/2001  Kitazawa
(Continued)

FOREIGN PATENT DOCUMENTS

JP    2001-222375 A    8/2001
JP    2003-296026 A   10/2003
(Continued)

OTHER PUBLICATIONS

Li et al., "Algorithm of Fingertip Detection and Its Improvement Based on Kinect," 2017 International Conference on Industrial Informatics—Computing Technology, Intelligent Technology, Industrial Information Integration—4 pages.
(Continued)

*Primary Examiner* — Amare Mengistu
*Assistant Examiner* — Sarvesh J Nadkarni
(74) *Attorney, Agent, or Firm* — Dority & Manning, P.A.

(57) ABSTRACT

An operation detection method of detecting an operation of a pointing element with respect to an operation surface includes converting first and second taken image obtained by imaging the operation surface into first and second converted taken image calibrated with respect to the operation surface respectively, determining whether or not the pointing element contacts with the operation surface and is in a resting state based on the first and second converted taken image, selecting the first and second converted taken image at when it was determined that the pointing element contacts and to be in the resting state as first and second reference image, calculating a first difference in position between the pointing element in the first reference image and the pointing element in the first converted taken image, calculating a second difference in position between the pointing element in the second reference image selected and the pointing element in the second converted taken image, and determining whether or not the pointing element separated from the operation surface based on the first difference and the second difference.

5 Claims, 23 Drawing Sheets

(56) References Cited

U.S. PATENT DOCUMENTS

| | | | |
|---|---|---|---|
| 2008/0013826 A1* | 1/2008 | Hillis | G06F 3/0425 382/154 |
| 2009/0103780 A1* | 4/2009 | Nishihara | G06F 3/017 382/103 |
| 2010/0073578 A1 | 3/2010 | Tan | |
| 2013/0265228 A1 | 10/2013 | Tamura | |
| 2014/0294233 A1* | 10/2014 | Osamura | G06T 7/593 382/103 |

FOREIGN PATENT DOCUMENTS

| | | |
|---|---|---|
| JP | 2010-072977 A | 4/2010 |
| JP | 2012-048393 A | 3/2012 |
| JP | 2014-142684 A | 8/2014 |
| JP | 2014-153870 A | 8/2014 |
| JP | 2014-202540 A | 10/2014 |
| JP | 2016-014954 A | 1/2016 |
| JP | 2016-218893 A | 12/2016 |
| JP | 2017-219942 A | 12/2017 |

OTHER PUBLICATIONS

Raheja et al., "Fingertip Detection: A Fast Method with Natural Hand," International Journal of Embedded Systems and Computer Engineering, vol. 3, No. 2, Jul.-Dec. 2011—10 pages.

Wang et al., "Efficient Hand Segmentation and Fingertip Detection Using Color Features of Skin and Fingernail," IEICE Trans. Information & Systems, vol. E96-D, No. 8, Aug. 2013—4 pages.

Lee et al., "Region-based corner detection by radial projection," Journal of the Optical Society of Korea, vol. 15, No. 2, Jun. 2011—3 pages.

Dawod et al., "Fingertips tracking based on gradient vector," Int. J. Advance Soft Compu. Appl., vol. 7, No. 3, Nov. 2015—11 pages.

Criminisi et al., "Computing the plane to plane homography," A Plane Measuring Device, Jul. 1997 http://www.robots.ox.ac.uk/~ygg/presentations/bmyc97/criminispaper/node3.html—2 pages.

* cited by examiner

TWO CAMERA TOUCH OPERATION DETECTION METHOD, DEVICE, AND SYSTEM

The present application is based on, and claims priority from JP Application Serial Number 2020-024062, filed Feb. 17, 2020, the disclosure of which is hereby incorporated by reference herein in its entirety.

BACKGROUND

1. Technical Field

The present disclosure relates to an operation detection method, an operation detection device, and a display system.

2. Related Art

In the past, there has been known a device for detecting a position in an operation surface pointed by a pointing element. For example, the device described in JP-A-2016-218893 is provided with a light projection section for projecting pattern light toward an image displayed on a display surface, an imaging section the imaging range of which includes the image, and a processing section for detecting an input operation. The processing section detects the input operation based on a taken image obtained by the imaging section imaging the display surface on which the pattern light is projected, and a taken image obtained by the imaging section imaging the display surface on which the pattern light is projected, and on which the input operation as a pointing input operation has been performed.

However, when detecting the pointing element with a single imaging section, it is difficult to recognize the distance between the pointing element and the operation surface, and it is difficult to determine whether or not an operation has been applied to the operation surface. Therefore, there has been desired to realize a method capable of improving the detection accuracy of the operation by the pointing element using a stereo camera.

SUMMARY

An aspect of the present disclosure is directed to an operation detection method of detecting an operation of a pointing element with respect to an operation surface, the method including a conversion step of converting a first taken image and a second taken image obtained by imaging the operation surface from imaging viewpoints different from each other into images calibrated with respect to the operation surface, a first determination step of determining whether or not the pointing element has contact with the operation surface and is in a resting state based on images of the pointing element imaged in the first taken image and the second taken image converted, a first calculation step of selecting the first taken image when it was determined that the pointing element had contact with the operation surface and was in the resting state as a first reference image, and calculating a difference in position between the pointing element imaged in the first reference image selected and the pointing element imaged in the first taken image, a second calculation step of selecting the second taken image when it was determined that the pointing element had contact with the operation surface and was in the resting state as a second reference image, and calculating a difference in position between the pointing element imaged in the second reference image selected and the pointing element imaged in the second taken image, and a second determination step of determining whether or not the pointing element separated from the operation surface based on the difference in position calculated in the first calculation step and the difference in position calculated in the second calculation step.

The operation detection method described above may be configured such that, in the first calculation step, the difference in position between the pointing element imaged in each of a plurality of the first taken images input sequentially and the pointing element imaged in the first reference image is calculated, and then an average value of the plurality of differences in position of the pointing element calculated is calculated as a first average value, in the second calculation step, the difference in position between the pointing element imaged in each of a plurality of the second taken images input sequentially and the pointing element imaged in the second reference image is calculated, and then an average value of the plurality of differences in position of the pointing element calculated is calculated as a second average value, and in the second determination step, when a difference between the first average value and the second average value is larger than a threshold value, it is determined that the pointing element separated from the operation surface.

The operation detection method described above may be configured such that, in the first determination step, a contact of the pointing element with the operation surface is determined based on a disparity occurring between an image of the pointing element imaged in the first taken image and an image of the pointing element imaged in the second taken image.

The operation detection method described above may be configured such that, in the first determination step, whether or not the pointing element is in the resting state is determined by comparing images of the pointing element imaged in the first reference image and the second reference image with images of the pointing element imaged in the first taken images and the second taken images taken before the first reference image and the second reference image.

Another aspect of the present disclosure is directed to an operation detection device including a conversion section configured to convert a first taken image and a second taken image obtained by imaging an operation surface from imaging viewpoints different from each other into images calibrated with respect to the operation surface, a first determination section configured to determine whether or not the pointing element has contact with the operation surface and is in a resting state based on images of the pointing element imaged in the first taken image and the second taken image converted, a first calculation section configured to select the first taken image when it was determined that the pointing element had contact with the operation surface and was in the resting state as a first reference image, and calculate a difference in position between the pointing element imaged in the first reference image selected and the pointing element imaged in the first taken image, a second calculation section configured to select the second taken image when it was determined that the pointing element had contact with the operation surface and was in the resting state as a second reference image, and calculate a difference in position between the pointing element imaged in the second reference image selected and the pointing element imaged in the second taken image, and a second determination section configured to determine whether or not the pointing element separated from the operation surface based on the difference in position calculated by the first calculation section and the difference in position calculated by the second calculation section.

Another aspect of the present disclosure is directed to a display system including an imaging device including a first imaging section and a second imaging section different in imaging viewpoint from each other, a conversion section configured to convert a first taken image taken by the first imaging section and a second taken image taken by the second imaging section into images calibrated with respect to the operation surface, a first determination section configured to determine whether or not the pointing element has contact with the operation surface and is in a resting state based on images of the pointing element imaged in the first taken image and the second taken image converted, a first calculation section configured to select the first taken image when it was determined that the pointing element had contact with the operation surface and was in the resting state as a first reference image, and calculate a difference in position between the pointing element imaged in the first reference image selected and the pointing element imaged in the first taken image, a second calculation section configured to select the second taken image when it was determined that the pointing element had contact with the operation surface and was in the resting state as a second reference image, and calculate a difference in position between the pointing element imaged in the second reference image selected and the pointing element imaged in the second taken image, a second determination section configured to determine whether or not the pointing element separated from the operation surface based on the difference in position calculated by the first calculation section and the difference in position calculated by the second calculation section, a detection section configured to detect an operation of the pointing element with respect to the operation surface based on a determination result of the first determination section and the second determination section, and a display device including a display section configured to display an image corresponding to the operation of the pointing element detected by the detection section on the operation surface.

DESCRIPTION OF AN EXEMPLARY EMBODIMENT

Hereinafter, an embodiment of the present disclosure will be described with reference to the drawings.

A-1. Configuration of Display System

Figure 1:
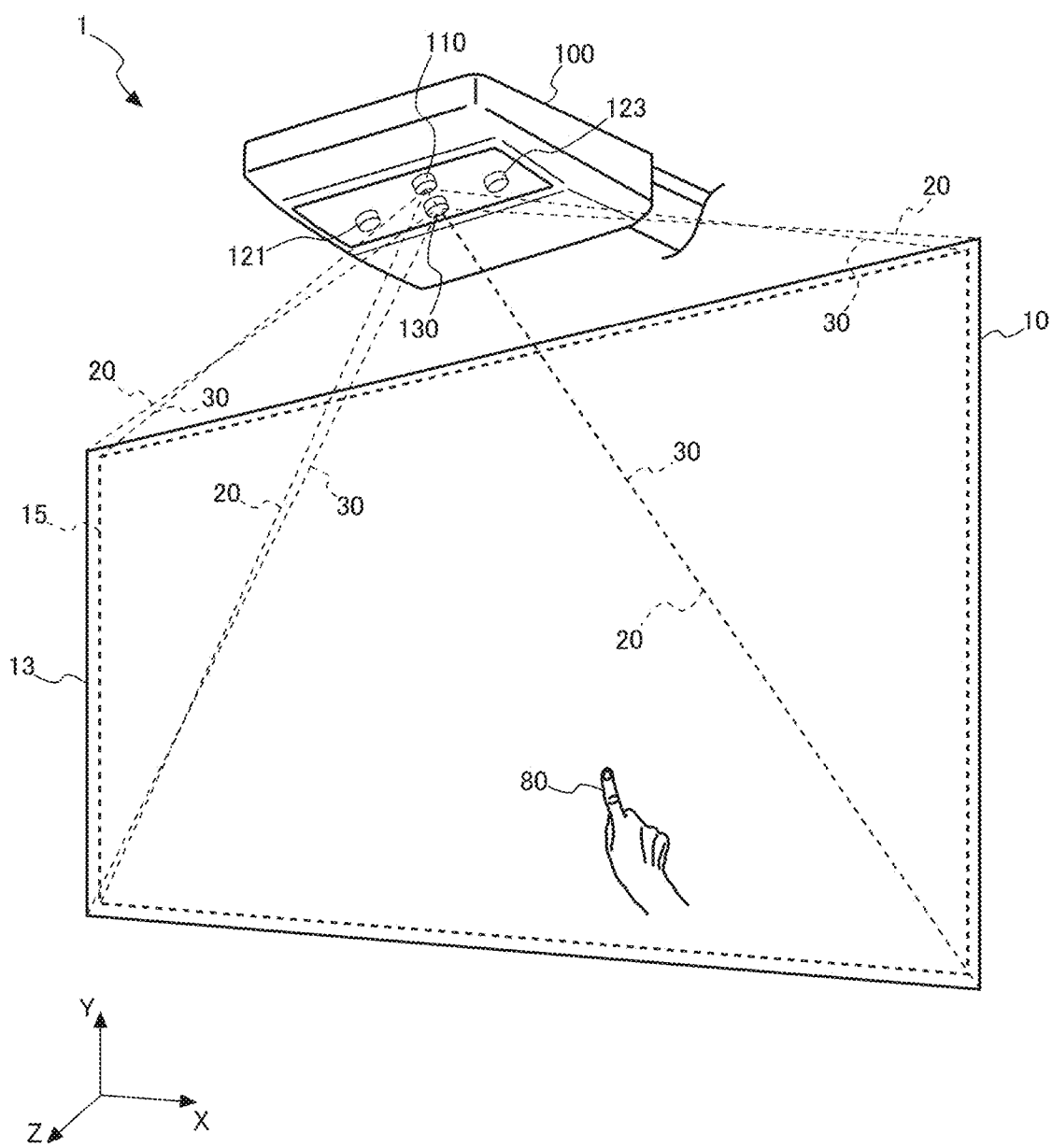
FIG. 1 is a perspective view of an interactive projection system.

FIG. 1 is a perspective view of an interactive projection system 1 as an example of a display system.

The interactive projection system 1 is provided with a projector 100 and a projection surface 10 on which the projector 100 projects an image. Hereinafter, the description will be presented assuming a normal direction of the projection surface 10 and a front side of the projection surface 10 as a Z-axis direction, a vertically upward direction along the projection surface 10 as a Y-axis direction, and a direction perpendicular to the Z-axis direction and the Y-axis direction as an X-axis direction. The projection surface 10 corresponds to an X-Y plane with Z=0. The projection surface 10 is an example of a display surface. Further, the projector 100 is an example of a display device.

The projector 100 generates image light 30 corresponding to image data, and then projects the image light 30 thus generated on the projection surface 10. Further, the projector 100 is provided with an interactive function. The interactive function means a function of detecting a position of the operation with a pointing element 80 to the projection surface 10, then displaying an image corresponding to the position or the trajectory of the pointing element 80, or making a change to an image displayed based on the position of the operation thus detected.

The projector 100 is provided with a projection section 110 for projecting the image light 30 from a projection opening, a first camera 121 and a second camera 123 for taking an image of the projection surface 10, and a detection light irradiation section 130 for performing irradiation with detection light 20 used for the detection of the pointing element 80. The first camera 121 corresponds to a first imaging section in the present disclosure, and the second camera 123 corresponds to a second imaging section in the present disclosure.

Although when the projection surface 10 on which the projector 100 projects the image light 30 is a screen formed of a flat surface is described in the present embodiment, a flat surface fixed to a wall surface or the like can also be used as the projection surface 10. Further, it is also possible for the projection surface 10 to be a curtain-like screen of a suspended type, a rising type, or the like. Further, it is also possible to use an indoor wall surface, a white board, a block board, and so on as the projection surface 10. Further, a front surface of the projection surface 10 is used as an operation surface 13 to be used for input of an operation using the pointing element 80.

Figure 2:
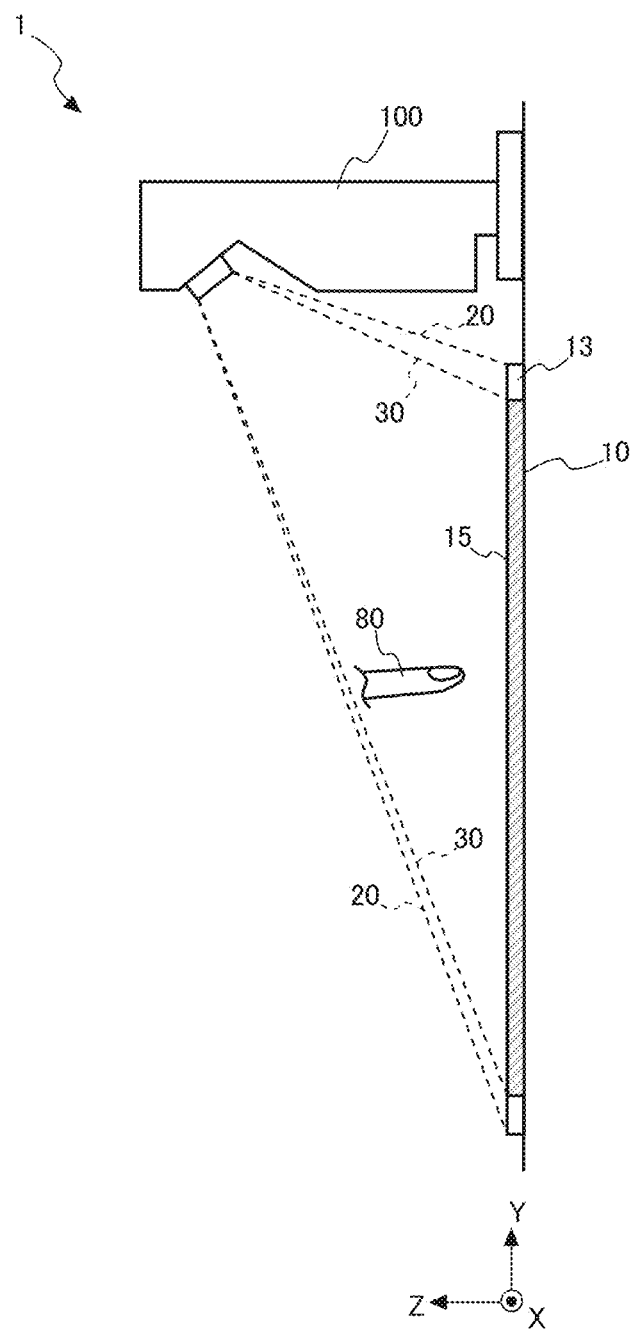
FIG. 2 is a side view showing an installation condition of a projector.

FIG. 2 is a side view of the interactive projection system 1.

The projector 100 in the present embodiment is fixed to the wall surface and is installed in front of and above the projection surface 10, and projects the image light 30 toward the projection surface 10 located on an obliquely downside. An area where the image light 30 is projected by the projector 100 in the projection surface 10 is referred to as a projection area 15. Further, the projector 100 performs irradiation with the detection light 20 in a direction corresponding to the operation surface 13. The detection light 20 is the light used for detecting the pointing element 80, and infrared light is used as the detection light 20 in the preset embodiment. By using the infrared light, it is possible to detect the pointing element 80 without being affected by the image light 30 mainly consisting of visible light, and further, no influence is made on the display with the image light 30. A range including at least a part of the projection surface 10 is irradiated with the detection light 20. In the present embodiment, a range covering the entire area of the projection surface 10 is irradiated. The direction corresponding to the operation surface 13 means a direction in which the operation of the pointing element 80 can be detected by an imaging section 120. More specifically, the direction corresponding to the operation surface 13 means a direction in which reflected light reflected by the pointing element 80 having approached within a predetermined distance from the operation surface 13 can be taken by the imaging section 120.

The first camera 121 and the second camera 123 are disposed at positions different from each other in the projector 100. The first camera 121 and the second camera 123 image the projection surface 10 from respective imaging viewpoints different from each other to thereby function as a stereo camera. In the present embodiment, the first camera 121 is disposed on the left side of the projection section 110 of the projector 100 so as to correspond to the projection surface 10, and the second camera 123 is disposed on the right side of the projection section 110 of the projector 100 so as to correspond to the projection surface 10. The first camera 121 is a left camera, and the taken image by the first camera 121 is referred to as a left taken image. Further, the second camera 123 is a right camera, and the taken image by the second camera 123 is referred to as a right taken image. The left taken image corresponds to a first taken image in the present disclosure, and the right taken image corresponds to a second taken image in the present disclosure.

The projector 100 images the projection surface 10 with the first camera 121 and the second camera 123 to detect the reflected light as the detection light 20 reflected by the pointing element 80. In the interactive projection system 1, it is possible to use at least one pointing element 80 of a non-light emitting type. As the pointing element 80, it is possible to use a non-light emitting object such as a finger or a pen. The pointing element 80 of the non-light emitting type is not particularly limited providing the infrared light is reflected by the pointing element 80, and in the present embodiment, there is described an example in which a finger of the user is used as the pointing element 80.

The first camera 121 and the second camera 123 are each set so as to be able to image the entire area of the projection surface 10, and each have a function of taking the image of the pointing element 80 with the projection surface 10 as a background. In other words, the first camera 121 and the second camera 123 each receive the light reflected by the projection surface 10 and the pointing element 80 out of the detection light 20 emitted from the detection light irradiation section 130 to thereby form the image including the pointing element 80. When using the two images respectively taken by the first camera 121 and the second camera 123, it is possible to obtain a three-dimensional position of the pointing element 80 using triangulation or the like. It should be noted that the number of the cameras can also be three or more.

A-2. Configuration of Projector 100

Figure 3:
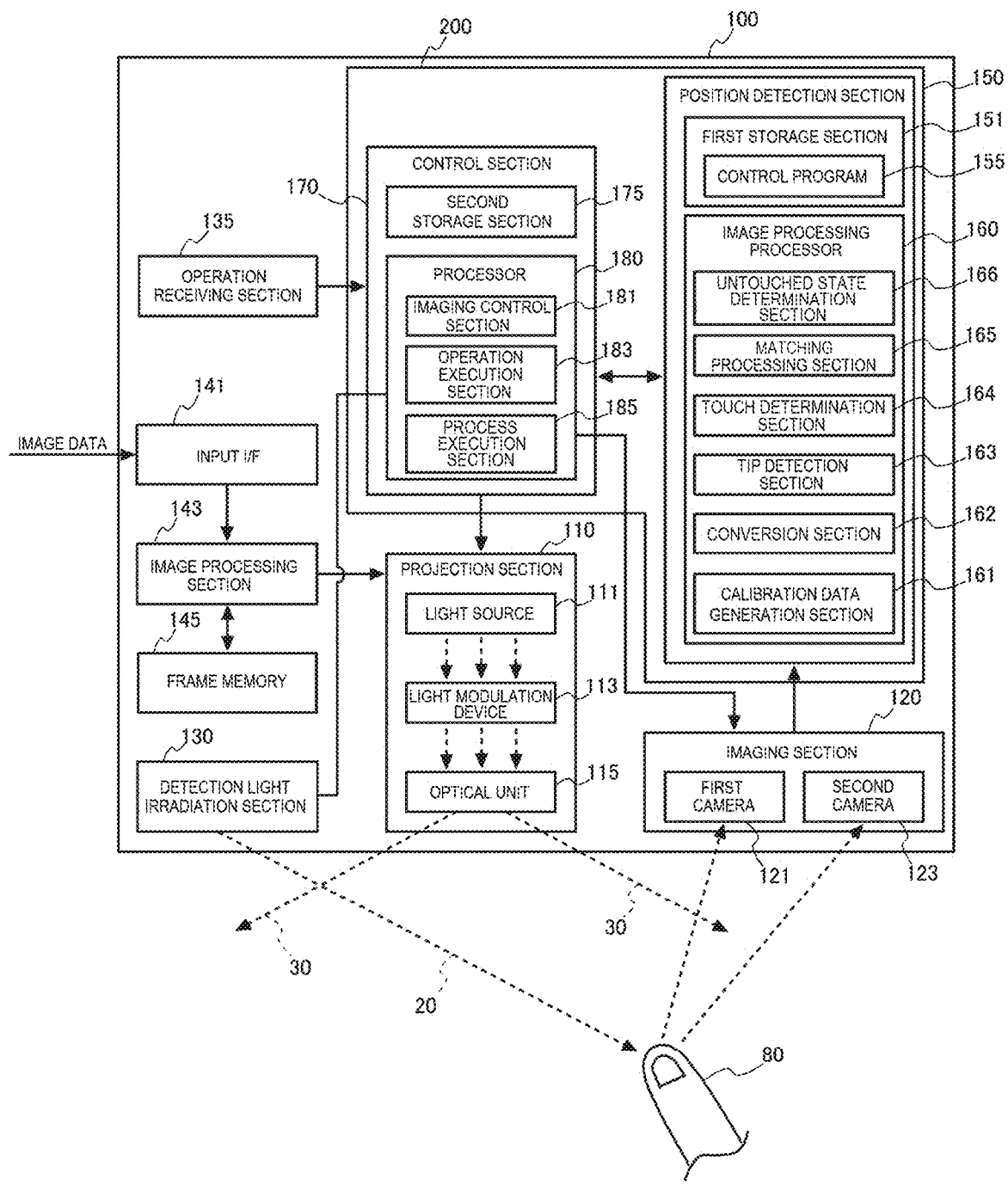
FIG. 3 is a block diagram showing a configuration of the projector.

FIG. 3 is a block diagram showing a configuration of the projector 100.

The projector 100 is provided with the projection section 110, the imaging section 120, the detection light irradiation section 130, an operation receiving section 135, an input interface 141, an image processing section 143, a frame memory 145, a position detection section 150, and a control section 170. The position detection section 150 and the control section 170 operate as an operation detection device 200.

The projection section 110 is provided with a light source 111, a light modulation device 113, and an optical unit 115. The projection section 110 corresponds to a display section in the present disclosure.

As the light source 111, there is used a lamp light source such as a halogen lamp, a xenon lamp, or a super high-pressure mercury lamp. Further, as the light source 111, there can also be used a solid-state light source such as an LED (Light Emitting Diode) or a laser source.

The light modulation device 113 is provided with a light modulation element for modulating light emitted by the light source 111 to generate the image light 30. As the light modulation element, it is possible to use, for example, a transmissive liquid crystal light valve, a reflective liquid crystal light valve, or a digital mirror device.

The optical unit 115 is provided with an optical element such as a lens or a mirror, and projects the image light 30 generated by the light modulation device 113 on the projection surface 10 in an enlarged manner. The image obtained by the image light 30 forming an image on the projection surface 10 is visually recognized by the user.

The imaging section 120 is provided with the first camera 121 and the second camera 123.

The first camera 121 and the second camera 123 are each provided with an imaging element for converting the light collected by the optical system such as a lens into an electric signal such as a CCD (Charge Coupled Device) or a CMOS (Complementary Metal Oxide Semiconductor). The first camera 121 and the second camera 123 are disposed so as to be able to image the reflected light as the detection light 20 reflected by the pointing element 80. Further, to the first camera 121 and the second camera 123, there are attached infrared filters for receiving the reflected light of the detection light 20.

The first camera 121 and the second camera 123 each take an image of a range including the operation surface 13. The first camera 121 and the second camera 123 each take an image of the range including the operation surface 13 at a predetermined frame rate, and then output the taken images thus formed to the position detection section 150. When the user makes the pointing element 80 approach the projection surface 10, the reflected light as the detection light 20 emitted by the detection light irradiation section 130 and then reflected by the pointing element 80 is imaged in the taken image by the imaging section 120.

The detection light irradiation section 130 has an LD (Laser Diode) or an LED as the light source for emitting the infrared light. Further, it is also possible for the detection light irradiation section 130 to be provided with an optical component for diffusing the infrared light emitted by the light source toward the projection surface 10.

The operation receiving section 135 receives an infrared signal transmitted by a remote controller not shown. The operation receiving section 135 outputs an operation signal corresponding to the infrared signal thus received from the remote controller to the control section 170. The operation signal is a signal corresponding to a switch of the remote controller operated.

The input interface 141 is a connection interface with an external device. The input interface 141 is provided with a connector to which a cable is coupled and an interface circuit for performing signal processing. The input interface 141 receives image data supplied from the external device coupled. The input interface 141 outputs the image data thus received to the image processing section 143.

The image data thus input is developed in the frame memory 145 by the image processing section 143. The frame memory 145 is formed of, for example, an SDRAM (Synchronous Dynamic Random Access Memory).

The image processing section 143 performs image processing on the image data having been developed in the frame memory 145. In the image processing performed by the image processing section 143, there are included, for example, a resolution conversion process or a resizing process, correction of a distortion aberration, a shape correction process, a digital zooming process, and an adjustment of the color shade or the luminance of the image. The image processing section 143 executes the process designated by the control section 170, and executes the process using a parameter input from the control section 170 as needed. Further, it is obviously possible for the image processing section 143 to execute two or more of the processes described above in combination with each other. The image processing section 143 retrieves the image data from the frame memory 145, and then outputs the image data thus retrieved to the projection section 110.

The image processing section 143 and the frame memory 145 are formed of, for example, an integrated circuit. The integrated circuit includes an LSI, an ASIC (Application Specific Integrated Circuit), a PLD (Programmable Logic Device), an FPGA (Field-Programmable Gate Array), an SoC (System-on-a-Chip), and so on. Further, it is also possible for an analog circuit to be included in a part of the configuration of the integrated circuit, or it is also possible to adopt a configuration having the control section 170 and the integrated circuit combined with each other.

The position detection section 150 is provided with the first storage section 151 and an image processing processor 160.

The first storage section 151 is formed of, for example, a volatile semiconductor storage device, a non-volatile semiconductor storage device, or volatile and non-volatile semiconductor storage devices. The first storage section 151 stores a control program 155 to be executed by the image processing processor 160. Further, the first storage section 151 stores a calibration image 201 and calibration data described later.

The image processing processor 160 is formed of a dedicated processor used for real-time digital image processing such as a GPU (Graphics Processing Unit). Further, the image processing processor 160 can also be formed of, for example, a DSP (Digital Signal Processor), an integrated circuit, or other digital circuits. In the integrated circuit, there are included, for example, an LSI, an ASIC, a PLD, an FPGA, and an SoC.

The position detection section 150 is provided with a calibration data generation section 161, a conversion section 162, a tip detection section 163, a touch determination section 164, a matching processing section 165, and an untouched state determination section 166 as functional blocks. These functional blocks represent the functions realized by the image processing processor 160 executing the command set described in the control program to perform arithmetic operations and control with the blocks for descriptive purposes.

Figure 4:
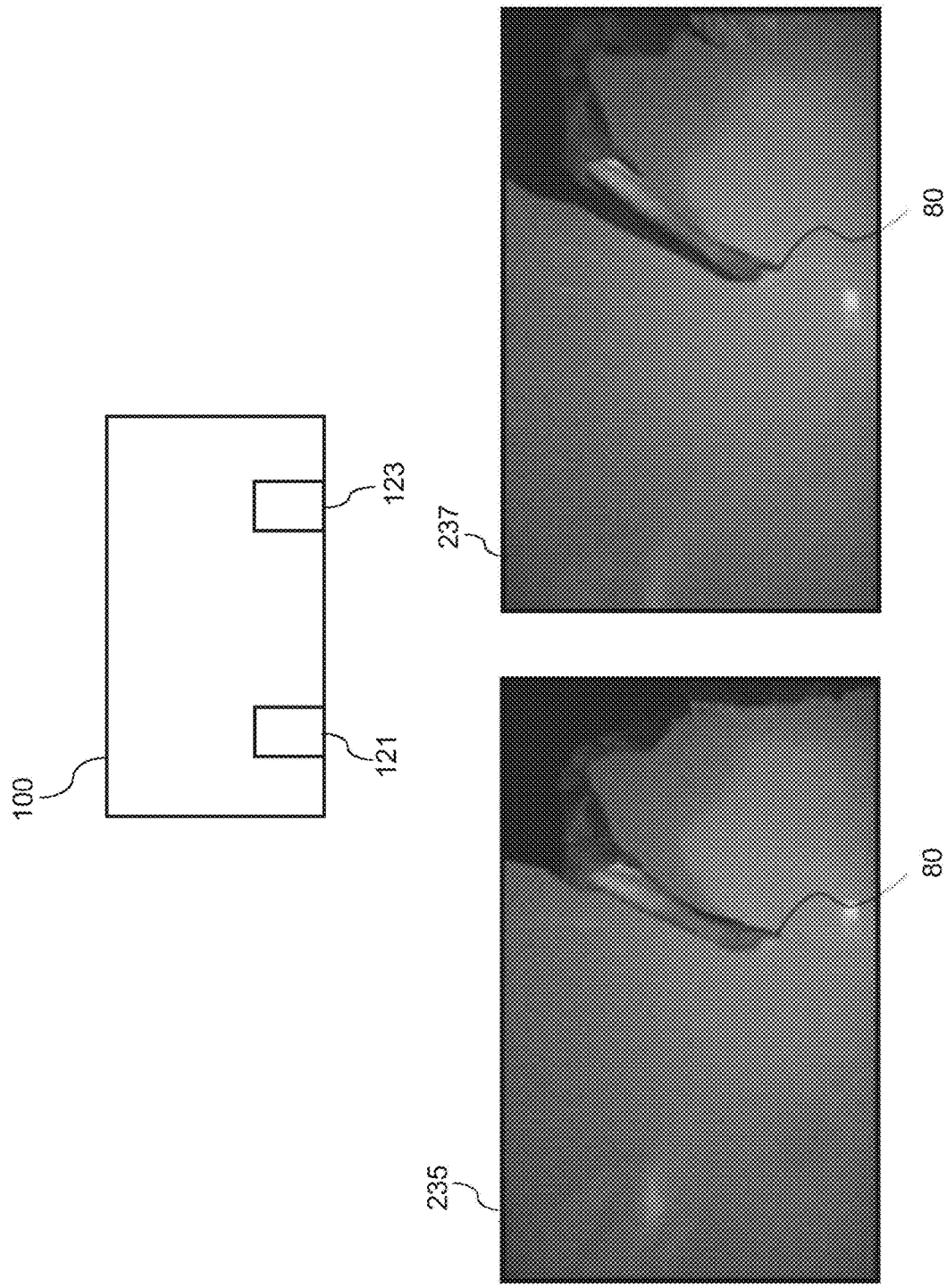
FIG. 4 is a diagram showing a left rectangular image and a right rectangular image.

To the position detection section 150, there are input the left taken image taken by the first camera 121 and the right taken image taken by the second camera 123. FIG. 4 shows an example of the left taken image and the right taken image. The left taken image and the right taken image shown in FIG. 4 are each an image obtained by imaging the finger of the user as the pointing element 80. More specifically, FIG. 4 shows the images respectively obtained by the first camera 121 and the second camera 123 imaging the range including fingers, a hand, and an arm at the same timing with the operation surface 13 as a background. In FIG. 4, there are shown a left rectangular image 235 corresponding to the left taken image by the first camera 121 as a left camera, and a right rectangular image 237 corresponding to the right taken image by the second camera 123 as a right camera. The left rectangular image 235 is an image obtained by deforming the left taken image using the calibration data generated by the calibration data generation section 161. The right rectangular image 237 is an image obtained by deforming the right taken image using the calibration data. The details of the left rectangular image 235 and the right rectangular image 237 will be described later.

The calibration data generation section 161 generates the calibration data. The calibration data includes first range information, second range information, a first image conversion coefficient, and a second image conversion coefficient.

The first range information is information representing a range of the projection area 15 in the left taken image. The second range information is information representing a range of the projection area 15 in the right taken image. The first image conversion coefficient is a coefficient for converting the shape of the image extracted from the left taken image based on the first range information into a rectangular shape. The second image conversion coefficient is a coefficient for converting the shape of the image extracted from the right taken image based on the second range information into a rectangular shape. The details of a method of generating the calibration data will be described later.

The conversion section 162 performs an action corresponding to the conversion step in the present disclosure. The conversion section 162 converts the left taken image and the right taken image into the left rectangular image 235 and the right rectangular image 237 as the taken images calibrated on the operation surface 13 using the calibration data generated by the calibration data generation section 161.

The taken image calibrated with respect to the operation surface 13 means an image adjusted so that the disparity on the operation surface 13 becomes 0. The tip detection section 163 clips an image corresponding to the projection area 15 from the left taken image using the first range information, and then converts the image thus clipped into the left rectangular image 235 using the first image conversion coefficient. Further, the tip detection section 163 clips an image corresponding to the projection area 15 from the right taken image using the second range information, and then converts the image thus clipped into the right rectangular image 237 using the second image conversion coefficient. The left rectangular image 235 and the right rectangular image 237 are each a rectangular image, and is an image adjusted so that the disparity becomes 0 at the position where Z=0 is true which is the position of the operation surface 13. Further, regarding the disparity between the left rectangular image 235 and the right rectangular image 237, the more distant on the front side of the operation surface 13, namely in the positive direction on the Z axis, the object is, the larger the disparity becomes. The reason that the disparity on the operation surface 13 between the left rectangular image 235 and the right rectangular image 237 is adjusted to 0 will be described later.

The tip detection section 163 forms the difference image 240 based on the left extracted image 231 and the right extracted image 233 converted by the conversion section 162. Although the tip detection section 163 in the present embodiment forms the difference image 240 by subtracting the right rectangular image 237 from the left rectangular image 235, it is also possible to form the difference image 240 by subtracting the left rectangular image 235 from the right rectangular image 237.

Then, an area in which the disparity amount between the left taken image and the right taken image is within a predetermined range is extracted by the tip detection section 163 as a change area 250. As described above, the left rectangular image 235 and the right rectangular image 237 are images adjusted so that the disparity with respect to the operation surface 13 becomes 0, and the difference image 240 is formed by subtracting the right rectangular image 237 from the left rectangular image 235. Therefore, an object having contact with the operation surface 13 where the disparity becomes 0 does not show up in the difference image 240. For example, when the tip of the pointing element 80 has contact with the operation surface 13, the tip of the pointing element 80 does not shown up in the difference image 240.

Further, a fingertip area 270 as an area in which the fingertip is imaged is extracted by the tip detection section 163 from the change area 250. Here, the tip detection section 163 removes an image of an arm and so on from the change area 250 to thereby extract the fingertip area 270 as an area corresponding to the fingertip.

Further, the tip detection section 163 detects the tip position of the finger as the pointing element 80 based on the shape of the pointing element 80. The details of the process executed by the tip detection section 163 will be described later with reference to FIG. 10 through FIG. 22.

The touch determination section 164 corresponds to a first determination section in the present disclosure, and performs an action corresponding to a first determination step. The touch determination section 164 detects a touch-hold state based on images of the pointing element 80 imaged in the left taken image and the right taken image. The touch-hold state means a state in which the pointing element 80 has contact with the operation surface 13, and the pointing element 80 having contact with the operation surface 13 is at rest. When performing an operation with the pointing element 80, in order to make the pointing element 80 have contact with the operation surface 13, the user firstly moves the pointing element 80 in a direction toward the operation surface 13. This direction is referred to as a first direction. When the user has made the pointing element 80 have contact with the operation surface 13, the user then moves the pointing element 80 on the operation surface 13 while keeping the pointing element 80 have contact with the operation surface 13. The direction in which the pointing element 80 moves on this occasion is referred to as a second direction. When switching the moving direction from the first direction to the second direction, in other words, at the moment when the pointing element 80 has contact with the operation surface 13, the user stops the motion of the pointing element 80 for a short period of time. This state in which the pointing element 80 stops the motion is defined as the touch-hold state. This period corresponds to a period as short as 2 through 5 frames or the like when, for example, the frame rate of the first camera 121 and the second camera 123 is 60 fps.

Firstly, the touch determination section 164 determines whether or not the pointing element 80 has contact with the operation surface 13 based on the tip position 275 of the pointing element 80 detected by the tip detection section 163. For example, it is possible for the touch determination section 164 to determine whether or not the pointing element 80 has contact with the operation surface 13 based on a change in the tip position 275 detected by the tip detection section 163. As described above, at the moment when the pointing element 80 has contact with the operation surface 13, the change in the tip position 275 stops occurring. The touch determination section 164 determines that the pointing element 80 has had contact with the operation surface 13 when the change in the tip position 275 of the pointing element 80 detected by the tip detection section 163 stops to be detected.

Further, it is possible for the touch determination section 164 to determine whether or not the tip of the pointing element 80 had contact with the operation surface 13 based on the change in the amount of the disparity occurring between the tip position 275 of the pointing element 80 detected from the left rectangular image 235 and the tip position 275 of the pointing element 80 detected from the right rectangular image 237. As described above, in the object taken in the left rectangular image 235 and the right rectangular image 237, the disparity becomes 0 at a position on the operation surface 13 where Z=0 is true, and the disparity increases as the object gets away from the operation surface 13 frontward, namely in the positive direction of the Z axis. Therefore, when gradually moving the pointing element 80 closer to the operation surface 13, the amount of the disparity occurring between the tip position 275 of the pointing element 80 detected from the left rectangular image 235 and the tip position 275 of the pointing element 80 detected from the right rectangular image 237 gradually decreases, and finally, the amount of the disparity vanishes. The touch determination section 164 determines whether or not the tip position 275 of the pointing element 80 had contact with the operation surface 13 based on the change in the amount of the disparity.

Then, when the touch determination section 164 has determined that the tip of the pointing element 80 had contact with the operation surface 13, the touch determination section 164 determines whether or not the pointing element 80 having contact with the operation surface 13 is in the resting state. The touch determination section 164 determines whether or not the resting state of the pointing element 80 continues for a predetermined number of frames targeting at the left taken images and the right taken images taken before the left rectangular image 235 and the right rectangular image with which it has been determined that the tip of the pointing element 80 has contact with the operation surface 13. Further, the touch determination section 164 determines whether or not there is a change in the tip position 275 of the pointing element 80 detected by the tip detection section 163 to determine whether or not the resting state of the pointing element 80 continues for a predetermined number of frames.

The matching processing section 165 obtains the left rectangular image 235 and the right rectangular image 237 formed when the touch determination section 164 has determined that the pointing element 80 had contact with the operation surface 13. The left rectangular image 235 thus obtained is referred to as a left reference image L0, and the right rectangular image 237 thus obtained is referred to as a right reference image R0. The left reference image L0 corresponds to a first reference image in the present disclosure, and the right reference image R0 corresponds to a second reference image in the present disclosure. The matching processing section 165 clips images in a predetermined range centered on the tip of the pointing element 80 from the left reference image L0 and the right reference image R0. The image clipped from the left reference image L0 is referred to as a left template image, and the image clipped from the right reference image R0 is referred to as a right template image.

To the matching processing section 165, there are sequentially input the left rectangular image 235 and the right rectangular image 237 obtained by deforming the left taken image and the right taken image taken by the first camera 121 and the second camera 123 so as to have a rectangular shape using the calibration data.

The matching processing section 165 performs template matching using the left template image and the right template image as the template on the left rectangular image 235 and the right rectangular image 237 input sequentially. The left rectangular image 235 input by the matching processing section 165 is described as a left rectangular image Lt0, and the right rectangular image 237 processed by the matching processing section 165 is described as a right rectangular image Rt0.

The matching processing section 165 performs the template matching between the left rectangular image Lt0 input and the left template image to detect an image range of the left rectangular image Lt0 coinciding with the left template image. The matching processing section 165 detects the tip position 275 of the pointing element 80 from the image range thus detected. The matching processing section 165 detects the position of the left rectangular image Lt0 corresponding to the tip position 275 of the left reference image L0 as the tip position. The tip position 275 of the pointing element 80 in the left rectangular image Lt0 is described as a left tip position 275L.

Similarly, the matching processing section 165 performs the template matching between the right rectangular image Rt0 input and the right template image to detect an image range of the right rectangular image Rt0 coinciding with the right template image. The matching processing section 165 detects the tip position 275 of the pointing element 80 from the image range thus detected. The matching processing section 165 detects the position of the right rectangular image Rt0 corresponding to the tip position 275 of the right reference image R0 as the tip position. The tip position 275 of the pointing element 80 in the right rectangular image Rt0 is described as a right tip position 275R.

The untouched state determination section 166 corresponds to a first calculation section, a second calculation section, and the second determination section, and performs actions corresponding to a first calculation step, a second calculation step, and a second determination step. To the untouched state determination section 166, there are input the left rectangular image Lt0 and information representing the left tip position 275L of the pointing element 80 imaged in the left rectangular image Lt0 from the matching processing section 165. Further, to the untouched state determination section 166, there are input the right rectangular image Rt0 and information representing the right tip position 275R of the pointing element 80 imaged in the right rectangular image Rt0 from the matching processing section 165.

As an action corresponding to the first calculation step, the untouched state determination section 166 calculates a difference in position between the left tip position 275L of the left reference image L0 and the left tip position 275L of the left rectangular image Lt0 having been input. Further, the untouched state determination section 166 calculates differences in position from the left tip position 275L of the left reference image L0 targeting at a plurality of left rectangular images 235. Although in the present embodiment, when performing the process targeting at, for example, three images of the left rectangular image Lt0, a left rectangular image Lt+1, and a left rectangular image Lt+2 will be described, the number of the left taken images on which the untouched state determination section 166 performs the process is arbitrary. The left rectangular image Lt+1 is an image taken next to the left rectangular image Lt0, and the left rectangular image Lt+2 is an image taken next to the left rectangular image Lt+1.

Similarly, as an action corresponding to the second calculation step, the untouched state determination section 166 calculates a difference in position between the right tip position 275R of the right reference image R0 and the right tip position 275R of the right rectangular image Rt0 having been input. Further, the untouched state determination section 166 calculates differences in position from the right tip position 275R of the right reference image R0 targeting at a plurality of right rectangular images 237. In the present embodiment, the process is performed targeting at, for example, three images of the right rectangular image Rt0, a right rectangular image Rt+1, and a right rectangular image Rt+2. The right rectangular image Rt+1 is an image taken next to the right rectangular image Rt0, and the right rectangular image Rt+2 is an image taken next to the right rectangular image Rt+1.

When the untouched state determination section 166 has respectively calculated the difference in position from the left tip position 275L of the left reference image L0 targeting at the left rectangular image Lt0, the left rectangular image Lt+1, and the left rectangular image Lt+2, the untouched state determination section 166 then performs an action corresponding to the second determination step. The untouched state determination section 166 calculates an average value of the differences in position thus calculated. The average value thus calculated is described as a left average value Ave_L. The left average value Ave_L corresponds to a first average value in the present disclosure.

Further, when the untouched state determination section 166 has respectively calculated the differences in position from the right tip position 275R of the right reference image R0 targeting at the right rectangular image Rt0, the right rectangular image Rt+1, and the right rectangular image Rt+2, the untouched state determination section 166 calculates the average value of the differences in position thus calculated. The average value thus calculated is described as a right average value Ave_R. The right average value Ave_R corresponds to a second average value in the present disclosure.

The untouched state determination section 166 subtracts the right average value Ave_R from the left average value Ave_L, and then compares the result of the subtraction with a threshold value set in advance. The untouched state determination section 166 compares (left average value Ave_L)−(right average value Ave_R) with the threshold value to thereby determine whether or not the disparity occurring between the left taken image and the right taken image is no smaller than the threshold value. As described above, the present embodiment is adjusted so that the disparity vanishes at the position of Z=0 which is the position of the projection surface 10, and the disparity increases as the distance from the projection surface 10 increases. When the value of (left average value Ave_L)−(right average value Ave_R) is larger than the threshold value, the untouched state determination section 166 determines that the pointing element 80 is separated from the operation surface 13, and is in a hovering state. Further, when the value of (left average value Ave_L)−(right average value Ave_R) is no larger than the threshold value, the untouched state determination section 166 determines that the pointing element 80 has contact with the operation surface 13, and is in a touch state.

When the untouched state determination section 166 has determined that the pointing element 80 is in the touch state, the untouched state determination section 166 outputs the coordinate information representing the left tip position 275L of the left rectangular image Lt0, and the coordinate information representing the right tip position 275R of the right rectangular image Rt0 calculated by the matching processing section 165 to the control section 170.

Further, when the untouched state determination section 166 has determined that the pointing element 80 is in the hovering state, the untouched state determination section 166 does not output the coordinate information of the left tip position 275L and the right tip position 275R to the control section 170.

The control section 170 is a computer device provided with a second storage section 175 and a processor 180. The second storage section 175 is provided with a volatile storage device such as a RAM (Random Access Memory), and a nonvolatile storage device such as a ROM (Read Only Memory) or a flash memory. The second storage section 175 stores a control program to be executed by the processor 180. In the control program, there is included, for example, firmware.

The processor 180 is an arithmetic processing device formed of a CPU (Central Processing Unit) or an MPU (Micro Processing Unit). The processor 180 executes the control program to control each section of the projector 100. The processor 180 can be formed of a single processor, or can also be formed of a plurality of processors. Further, the processor 180 can also be formed of an SoC integrated with a part or the whole of the second storage section 175 and other circuits. Further, the processor 180 can also be formed of a combination of the CPU for executing a program and a DSP for executing predetermined arithmetic processing. Further, it is also possible to adopt a configuration in which all of the functions of the processor 180 are implemented in the hardware, or it is also possible to configure all of the functions of the processor 75 using a programmable device.

The control section 170 is provided with an imaging control section 181, an operation detection section 183, and a process execution section 185 as functional blocks. These functional blocks represent the functions realized by the processor 180 executing the command set described in the control program to perform arithmetic operations and control with the blocks for descriptive purposes.

The imaging control section 181 makes the detection light irradiation section 130 perform the irradiation with the detection light, and makes the imaging section 120 perform imaging. The imaging section 120 images a range including the projection surface 10 at a predetermined frame rate to form a taken image. The taken image formed by the imaging section 120 is input to the position detection section 150.

The operation detection section 183 corresponds to a detection section in the present disclosure. The operation detection section 183 detects the operation of the pointing element 80 to the operation surface 13 in accordance with the determination result in the touch determination section 164 and the untouched state determination section 166. When the touch determination section 164 has determined that the pointing element 80 has contact with the operation surface 13, the coordinate information of the coordinate system set to the left taken image and the coordinate information of the coordinate system set to the right taken image are input to the operation detection section 183. Further, when the untouched state determination section 166 has determined that the pointing element 80 does not have contact with the operation surface 13, the coordinate information is not input to the operation detection section 183.

The operation detection section 183 identifies the position in the operation surface 13 pointed by the pointing element 80 based on the coordinate information input, and then outputs the coordinate information representing the position in the operation surface thus identified. For example, the calibration image 201 shown in FIG. 8 described later is taken by the first camera 121, and then the positions of the marks 205 formed in the calibration image 201 and the positions of the marks 205 in the left taken image are made to correspond to each other. Thus, the coordinate in the left taken image and the coordinate in the operation surface 13 are made to correspond to each other. Further, the calibration image 201 is taken by the second camera 123, and then the positions of the marks 205 formed in the calibration image 201 and the positions of the marks 205 in the right taken image are made to correspond to each other. Thus, the coordinate in the right taken image and the coordinate in the operation surface 13 are made to correspond to each other.

The process execution section 185 detects the operation based on the coordinate information input from the operation detection section 183, and then executes the process corresponding to the operation thus detected. For example, when an operation of moving the pointing element 80 having contact with the operation surface 13 on the operation surface 13 has been detected, the process execution section 185 draws an image corresponding to the trajectory of the pointing element 80 thus moving in the projection area 15.

A-3. Overall Processing Flow

Figure 5:
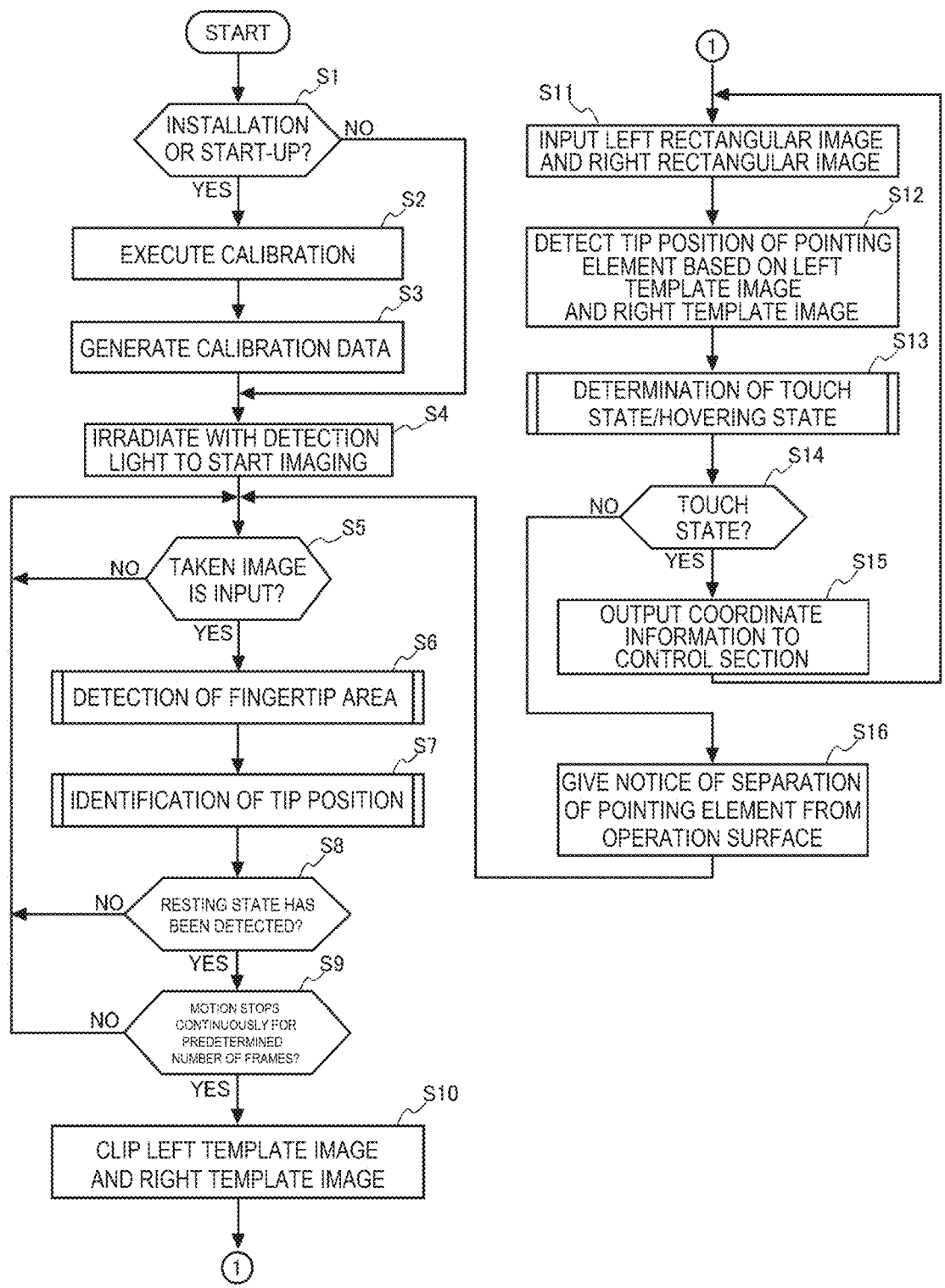
FIG. 5 is a flowchart showing an overall flow.
Figure 6:
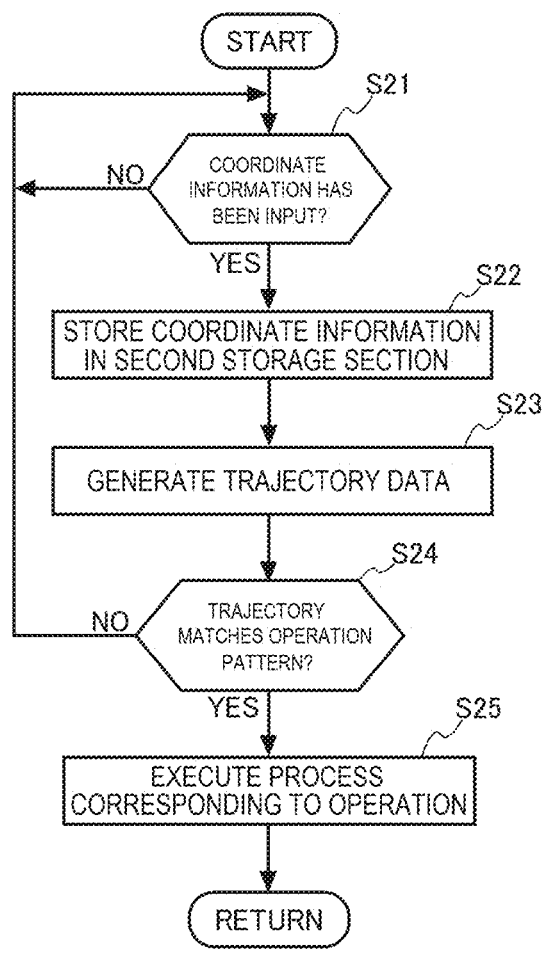
FIG. 6 is a flowchart showing an operation of a control section.

FIG. 5 and FIG. 6 correspond to a flowchart showing the operation of the projector 100.

The operation of the projector 100 will be described with reference to FIG. 5 and FIG. 6.

Firstly, the control section 170 determines (step S1) whether or not the state of the projector 100 is an installation state of the projector 100 or a start-up state of the projector 100. For example, it is possible for the control section 170 to determine that the projector 100 is in the installation state when the operation receiving section 135 has received a signal corresponding to a predetermined button provided to the remote controller. Further, it is also possible for the control section 170 to determine that the projector 100 is in the installation state when the projector 100 is powered ON for the first time after the factory shipment. When the projector 100 is not in the installation state nor in the start-up state (NO in the step S1), the control section 170 makes the transition to the process in the step S4.

Further, when the projector 100 is in the installation state or the start-up state (YES in the step S1), the control section 170 makes the position detection section 150 execute (step S2) the calibration. The control section 170 makes the projection section 110 project the calibration image 201, and makes the imaging section 120 perform imaging. The position detection section 150 generates (step S3) the calibration data based on the left taken image and the right taken image taken by the imaging section 120. The calibration data thus generated is stored in the first storage section 151.

When the generation of the calibration data is completed and the operation is received by the operation receiving section 135, the control section 170 makes the detection light irradiation section 130 start the irradiation with the detection light, and makes the imaging section 120 start imaging (step S4).

The position detection section 150 determines (step S5) whether or not the left taken image has been input from the first camera 121 and the right taken image has been input from the second camera 123. When the taken image is not input (NO in the step S5), the position detection section 150 stands ready to start the process until the left taken image and the right taken image are input.

When the left taken image and the right taken image are input (YES in the step S5), the position detection section 150 processes the left taken image and the right taken image to form the difference image 240, and then extracts the change area 250 from the difference image 240 to detect (step S6) the fingertip area 270. The details of the process of detecting the fingertip area 270 will be described later with reference to the flowchart shown in FIG. 9.

Then, the position detection section 150 identifies (step S7) the tip position 275 of the finger as the pointing element 80 from the fingertip area 270 thus detected. The details of the process of identifying the tip position 275 will be described later with reference to the flowchart shown in FIG. 19.

Then, the position detection section 150 determines whether or not the touch-hold state has been detected based on the tip position 275 thus identified. Firstly, in order to determine whether or not the tip of the pointing element 80 has contact with the operation surface 13, the position detection section 150 determines (step S8) whether or not the resting state in which the pointing element 80 is at rest has been detected. The position detection section 150 compares the coordinate of the tip position 275 of a certain taken image selected as a processing target and the coordinate of the tip position 275 of a taken image previous to this taken image with each other to determine whether or not the pointing element 80 is in the resting state. Here, the taken image used for the stop determination can be either one of the left rectangular image 235 and the right rectangular image 237, or can also be both of the left rectangular image 235 and the right rectangular image 237.

When the resting state is not detected (NO in the step S8), the position detection section 150 returns to the determination in the step S5, and waits until the next taken image is input from the imaging section 120. Further, when the resting state has been detected (YES in the step S8), the position detection section 150 determines (step S9) whether or not the resting state has continued for a predetermined number of frames. The position detection section 150 determines whether or not the resting state has continued for a predetermined number of frames targeting at the taken images taken before the certain taken image selected as the processing target in the step S8. The steps S8 and S9 correspond to a first determination step in the present disclosure.

When the detection of the resting state does not continue for the predetermined number of frames (NO in the step S9), the position detection section 150 returns to the determination in the step S5. Further, when the detection of the resting state continues for the predetermined number of frames (YES in the step S9), the position detection section 150 determines that the touch-hold state has been detected, and then makes the transition to the process in the step S10.

The position detection section 150 clips (step S10) an image of a preset size set in advance from the taken image selected in the step S8 as the template image. The position detection section 150 clips an image of a preset size set in advance centered on the tip position 275 as the left template image from the left reference image L0 which is the left taken image to be the base of the left rectangular image 235. Further, the position detection section 150 clips an image of a preset size set in advance centered on the tip position 275 as the right template image from the right reference image R0 which is the right taken image to be the base of the right rectangular image 237.

To the position detection section 150, there are sequentially input (step S11) the left rectangular image Lt0 and the right rectangular image Rt0 obtained by deforming the left taken image and the right taken image taken by the imaging section 120 so as to have a rectangular shape using the calibration data.

The position detection section 150 moves the left template image on the left rectangular image Lt0 input to the position detection section 150 to perform template matching. The position detection section 150 detects an area in the left rectangular image Lt0 which coincides with the left template image, and in the area in the left rectangular image Lt0 thus detected, the position detection section 150 detects (step S12) the left tip position 275L where the tip of the pointing element 80 is imaged. Similarly, the position detection section 150 moves the right template image on the right rectangular image Rt0 input to the position detection section 150 to perform template matching. The position detection section 150 detects an area in the right rectangular image Rt0 which coincides with the right template image, and in the area in the right rectangular image Rt0 thus detected, the position detection section 150 detects (step S12) the right tip position 275R where the tip of the pointing element 80 is imaged.

Then, the position detection section 150 performs state determination of the pointing element 80. The position detection section 150 determines (step S13) whether the state of the pointing element 80 is the touch state in which the pointing element 80 has contact with the operation surface 13, or the hovering state in which the pointing element 80 is separated from the operation surface 13. The details of the determination in the step S13 will be described with reference to the flowchart shown in FIG. 23. The step S13 corresponds to a second determination step in the present disclosure.

Then, when the position detection section 150 has determined in the step S13 that the pointing element 80 is in the touch state (YES in the step S14), the position detection section 150 outputs (step S15) the coordinate information calculated in the step S12 to the control section 170. Further, when the position detection section 150 has determined in the step S13 that the pointing element 80 is in the hovering state (NO in the step S14), the position detection section 150 does not output the coordinate information to the control section 170, but notifies (step S16) the control section 170 of the fact that the pointing element 80 has been separated from the operation surface 13.

Then, the operation of the control section 170 to which the coordinate information detected by the position detection section 150 has been input will be described with reference to the flowchart shown in FIG. 6.

The control section 170 determines (step S21) whether or not the coordinate information has been input from the position detection section 150. When the coordinate information is not input (NO in the step S21), the control section 170 stands ready to start the process until the coordinate information is input.

Further, when the coordinate information is input (YES in the step S21), the control section 170 stores (step S22) the coordinate information thus input in the second storage section 175.

Then, the control section 170 retrieves the coordinate information stored in the second storage section 175, and then generates (step S23) trajectory data representing the trajectory of the tip position of the pointing element 80 having contact with the operation surface 13 based on the coordinate data thus retrieved.

Then, the control section 170 determines (step S24) whether or not the trajectory of the tip position of the pointing element 80 has coincided with the operation pattern set in advance based on the trajectory data thus generated.

In the operation patterns, there are included, for example, slide operations of sliding the pointing element 80 on the operation surface 13 such as flick, swipe, and drag and drop, and tap operations such as tap, double tap, and long tap.

When the trajectory data fails to coincide with the operation pattern (NO in the step S24), the control section 170 returns to the determination in the step S21, and waits until the coordinate information is input from the position detection section 150. Further, when the trajectory data has coincided with the operation pattern (YES in the step S24), the control section 170 determines that the operation corresponding to the operation pattern has been input. In this case, the control section 170 executes (step S25) the process corresponding to the operation thus input.

For example, when a slide operation has been detected, the control section 170 moves the display position of the image which is displayed at the contact position where the contact with the pointing element 80 has been detected for the first time to the contact position where the contact with the pointing element 80 has been detected for the last time. Further, when the tap operation is detected, and an icon is displayed at the position in the operation surface 13 where the contact with the pointing element 80 has been detected by the tap operation, the control section 170 determines that this icon has been selected.

A-4. Calibration

Then, the calibration will be described with reference to FIG. 7 and FIG. 8.

Figure 7:
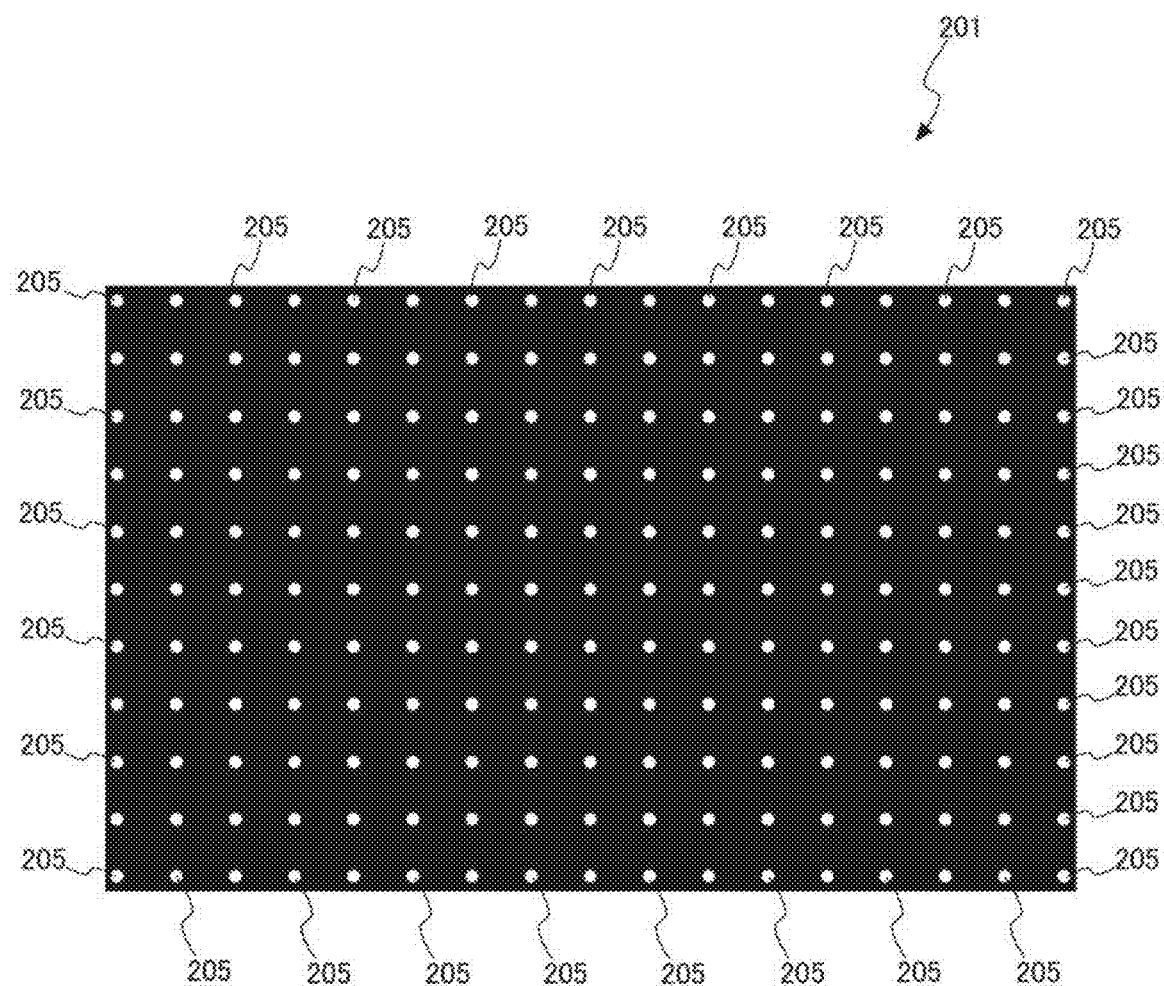
FIG. 7 is a diagram showing an example of a calibration image.

FIG. 7 is a diagram showing an example of the calibration image 201.

Firstly, due to the control by the control section 170, the projection section 110 is made to project the calibration image 201 shown in FIG. 7, and the first camera 121 and the second camera 123 are made to image the projection surface 10 on which the calibration image 201 is projected.

As shown in FIG. 7, the calibration image 201 is an image in which the marks 205 each having a predetermined shape are arranged in the vertical direction and the horizontal direction of the calibration image 201 at regular intervals. In the present embodiment, as the calibration image 201, there is used an image in which white dots as the marks 205 are arranged in the vertical direction and the horizontal direction of the calibration image 201 at regular intervals on a black background.

The calibration data generation section 161 obtains the left taken image obtained by imaging the projection surface 10 on which the calibration image 201 is projected with the first camera 121, and the right taken image obtained by imaging the projection surface 10 with the second camera 123.

The calibration data generation section 161 refers to the first range information to extract the area of the left taken image corresponding to the projection area 15. Similarly, the calibration data generation section 161 refers to the second range information to extract the area of the right taken image corresponding to the projection area 15. The area of the left taken image corresponding to the projection area 15 thus extracted is referred to as a left extracted image 231, and the area of the right taken image corresponding to the projection area 15 thus extracted is referred to as a right extracted image 233.

Figure 8:
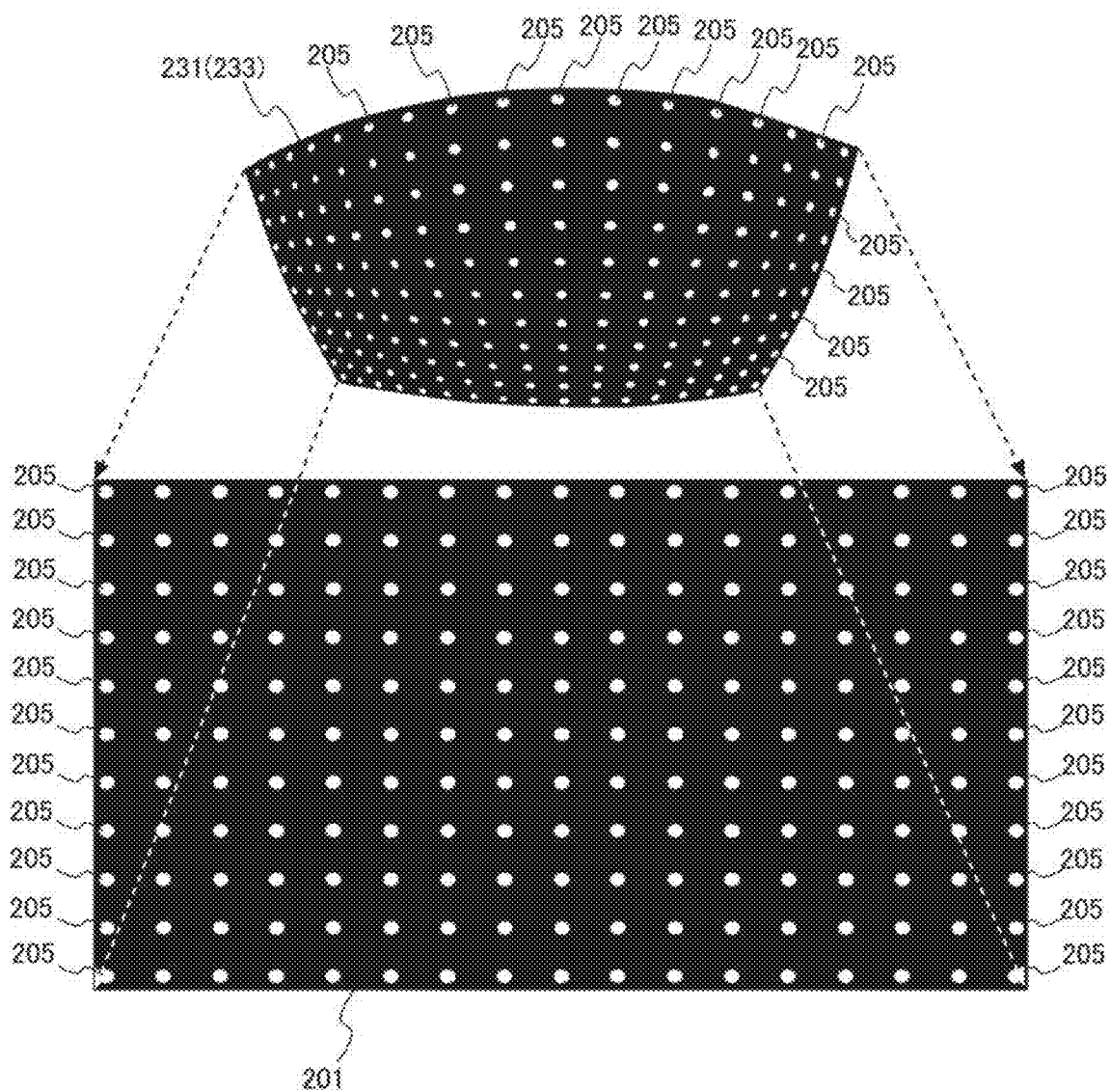
FIG. 8 is an explanatory diagram for explaining a conversion method of converting a left extracted image and a right extracted image into a rectangular shape.

FIG. 8 is a diagram showing a deformation method of deforming the shapes of the left extracted image 231 and the right extracted image 233 into rectangular shapes. It should be noted that since the left extracted image 231 and the right extracted image 233 are the same in the deformation method as each other, the deformation method for the left extracted image 231 will hereinafter be described.

The calibration data generation section 161 compares the calibration image 201 stored in the first storage section 151 with the left extracted image 231 and the right extracted image 233 to decide the first image conversion coefficient and the second image conversion coefficient. Specifically, the calibration data generation section 161 compares the positions of the marks 205 in the calibration image 201 with the positions of the marks in the left extracted image 231, and compares the vertexes of the calibration image 201 with the vertexes of the left extracted image 231. The calibration data generation section 161 decides a stretching direction and a stretching amount as deformation amounts for deforming the left extracted image 231 into the same rectangular shape as that of the calibration image 201 as the first image conversion coefficient based on these comparison results. Similarly, the calibration data generation section 161 compares the positions of the marks 205 in the calibration image 201 with the positions of the marks in the right extracted image 233, and compares the vertexes of the calibration image 201 with the vertexes of the right extracted image 233. The calibration data generation section 161 decides a stretching direction and a stretching amount as deformation amounts for deforming the right extracted image 233 into the same rectangular shape as that of the calibration image 201 as the second image conversion coefficient based on these comparison results.

The first image conversion coefficient is a coefficient for converting the shape of the left extracted image 231 so that the positions of the marks 205 of the left extracted image 231 coincide with the positions of the marks 205 formed in the calibration image 201. Further, the second image conversion coefficient is a coefficient for converting the shape of the right extracted image 233 so that the positions of the marks 205 of the right extracted image 233 coincide with the positions of the marks 205 formed in the calibration image 201. Therefore, the left extracted image 231 converted using the first image conversion coefficient and the right extracted image 233 converted using the second image conversion coefficient coincide with the calibration image 201. Therefore, the left extracted image 231 and the right extracted image 233 are converted so that the disparity on the projection surface 10 becomes 0.

A-5. Detection of Fingertip Area

Figure 9:
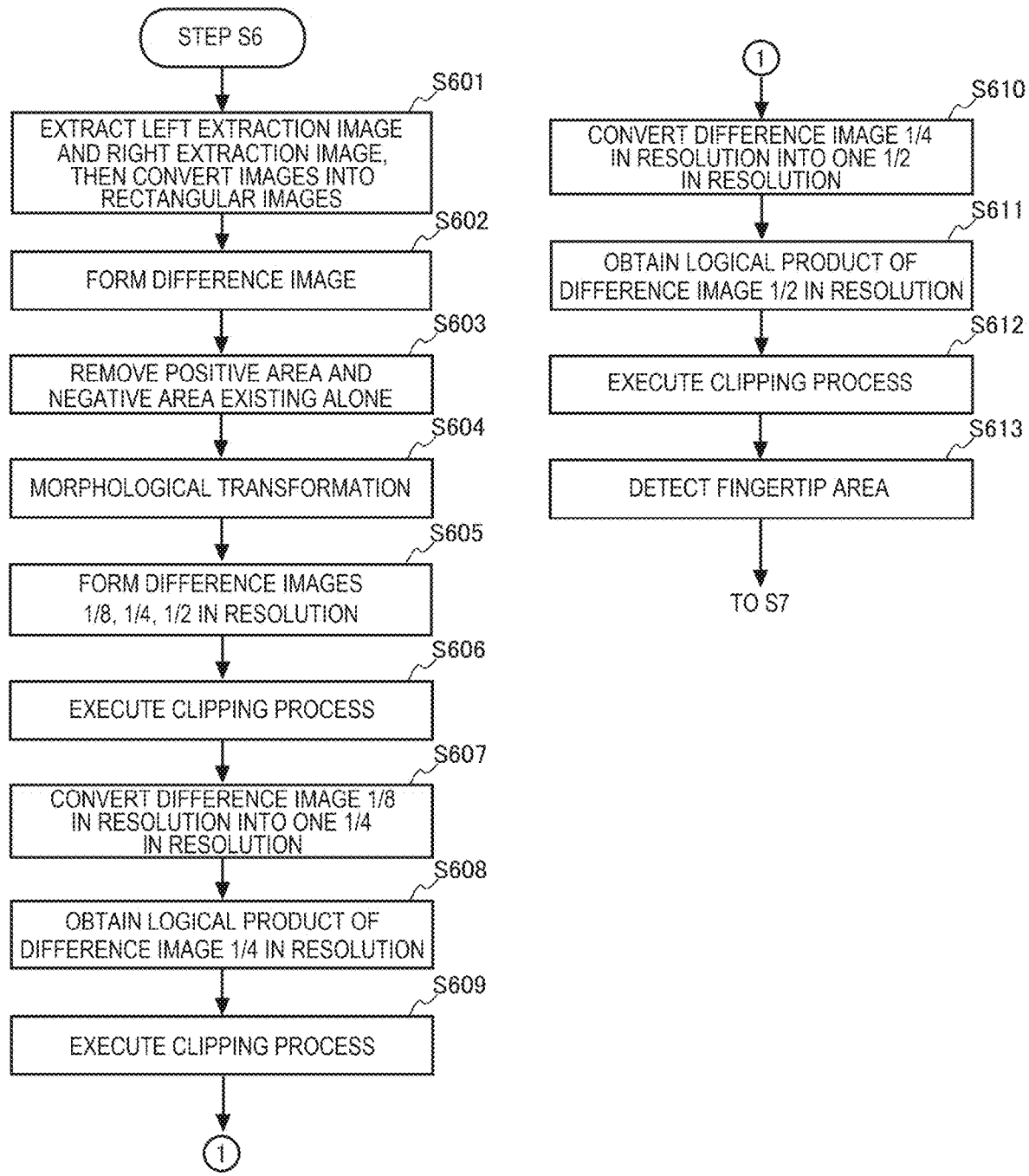
FIG. 9 is a flowchart showing a process of detecting a fingertip area.

FIG. 9 is a flowchart showing a detection process for the fingertip area 270.

Then, the details of the detection process for the fingertip area 270 in the step S6 described above will be described with reference to the flowchart shown in FIG. 9.

Firstly, when the position detection section 150 obtains the left taken image of the first camera 121, the position detection section 150 extracts the left extracted image 231 from the left taken image using the calibration data, and then deforms the shape of the left extracted image 231 thus extracted into a rectangular shape to form (step S601) the left rectangular image 235. Similarly, when the position detection section 150 obtains the right taken image of the second camera 123, the position detection section 150 extracts the right extracted image 233 from the right taken image using the calibration data, and then deforms the shape of the right extracted image 233 into a rectangular shape to form (step S601) the right rectangular image 237. The step S601 corresponds to a conversion step in the present disclosure.

Then, the position detection section 150 forms (step S602) the difference image 240. The position detection section 150 forms the difference image 240 by subtracting the right rectangular image 237 from the left rectangular image 235.

Figure 10:
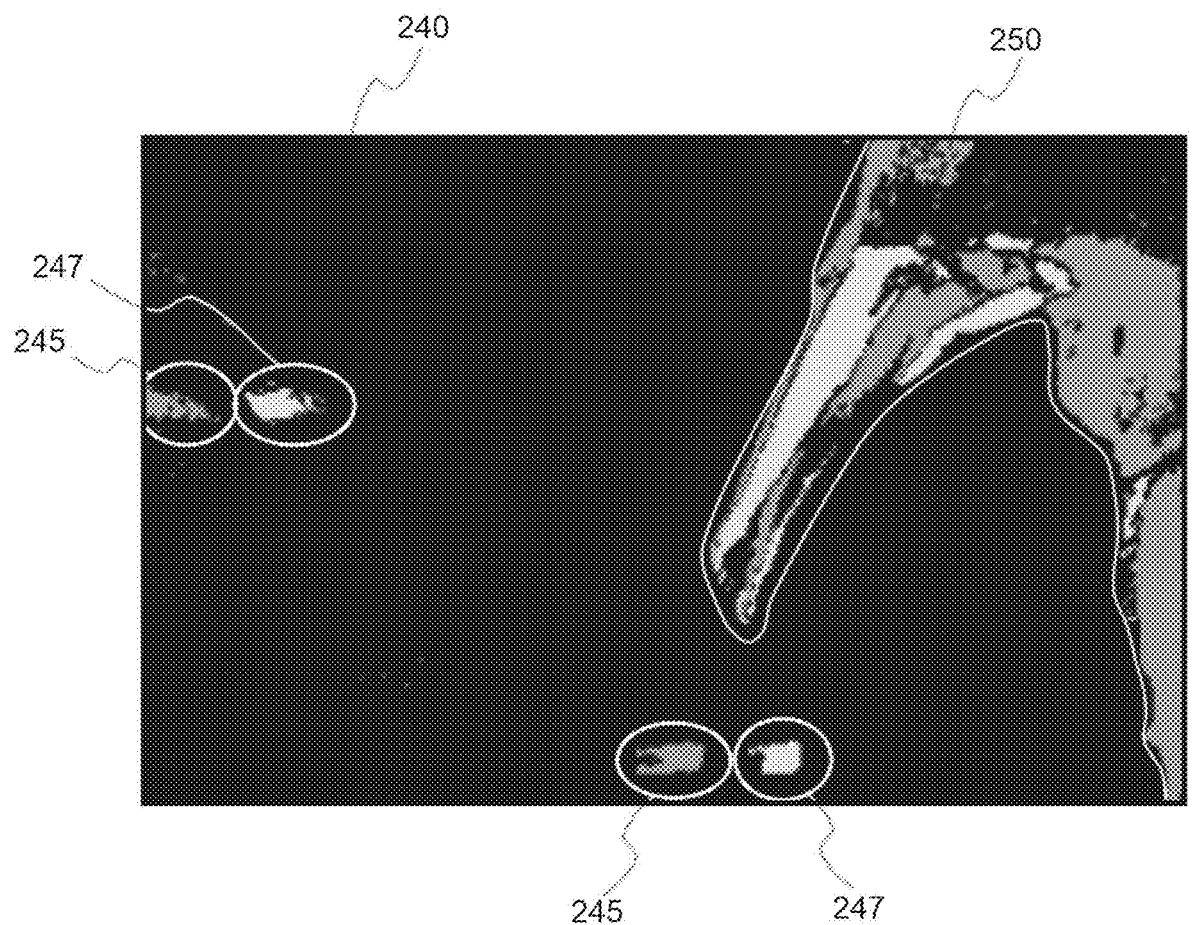
FIG. 10 is a diagram showing a difference image.

FIG. 10 is a diagram showing the difference image 240.

The difference image 240 includes the change area 250. The change area 250 is an area in which the disparity amount between the left rectangular image 235 and the right rectangular image 237 is within a predetermined range. The difference image 240 is an image obtained by subtracting the right rectangular image 237 from the left rectangular image 235. Therefore, the object which is located at the position where Z=0 is true as the position of the projection surface 10, and the disparity of which becomes 0 is not displayed in the difference image 240. Further, the more distant from the projection surface 10 the position where the object exists is, the larger the disparity becomes, and the larger the difference between the position of the object in the left rectangular image 235 and the position of the object in the right rectangular image 237 becomes.

Figure 11:
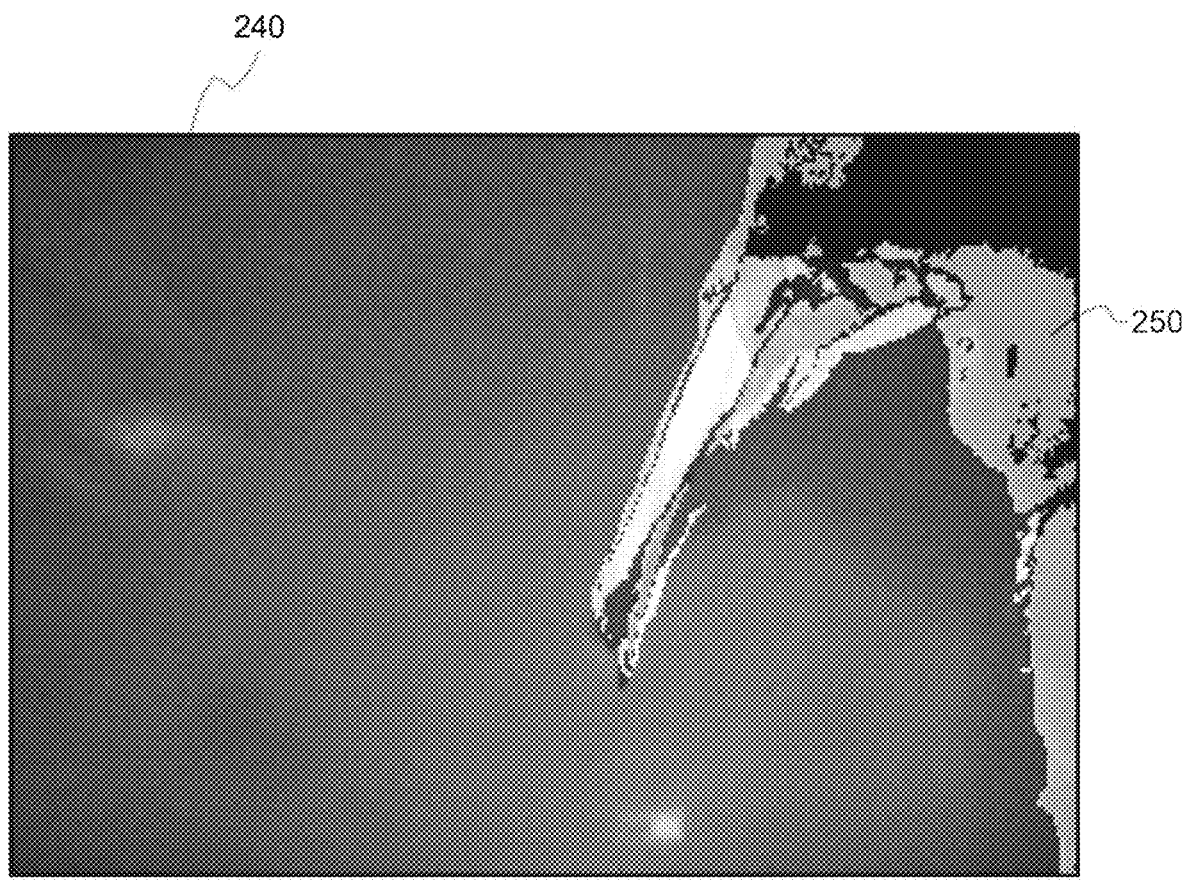
FIG. 11 is a diagram showing a state in which a positive area and a negative area are removed.

FIG. 11 is a diagram showing the difference image 240 with positive areas 245 and positive areas 247 removed.

Then, the position detection section 150 removes (step S603) isolated areas of the positive areas 245 and the positive areas 247 included in the difference image 240 thus formed. The position detection section 150 removes an area of the image where only the positive area 245 exists alone and an area of the image where only the positive area 247 exists alone in the difference image 240. The difference image 240 is an image formed by subtracting the right rectangular image 237 from the left rectangular image 235. When the same object is imaged in the left rectangular image 235 and the right rectangular image 237, and when the coordinate of the left rectangular image 235 where the object is imaged is larger than the coordinate of the right rectangular image 237 where the object is imaged, the positive area 245 occurs in the difference image 240. Further, when the coordinate of the right rectangular image 237 where the object is imaged is larger than the coordinate of the left rectangular image 235 where the object is imaged, the positive area 247 occurs in the difference image 240.

By removing the positive area 245 and the positive area 247 existing alone, only the area where the positive area 245 and the positive area 247 exist adjacent to each other with a distance no larger than a predetermined distance remains in the difference image 240. The area where the positive area 245 and the positive are 247 exist adjacent to each other becomes the change area 250. The change area 250 corresponds to an area where an amount of the disparity between the left rectangular image 235 and the right rectangular image 237 is within a predetermined range, and an area where the object existing near to the projection surface 10 is imaged.

Figure 12:
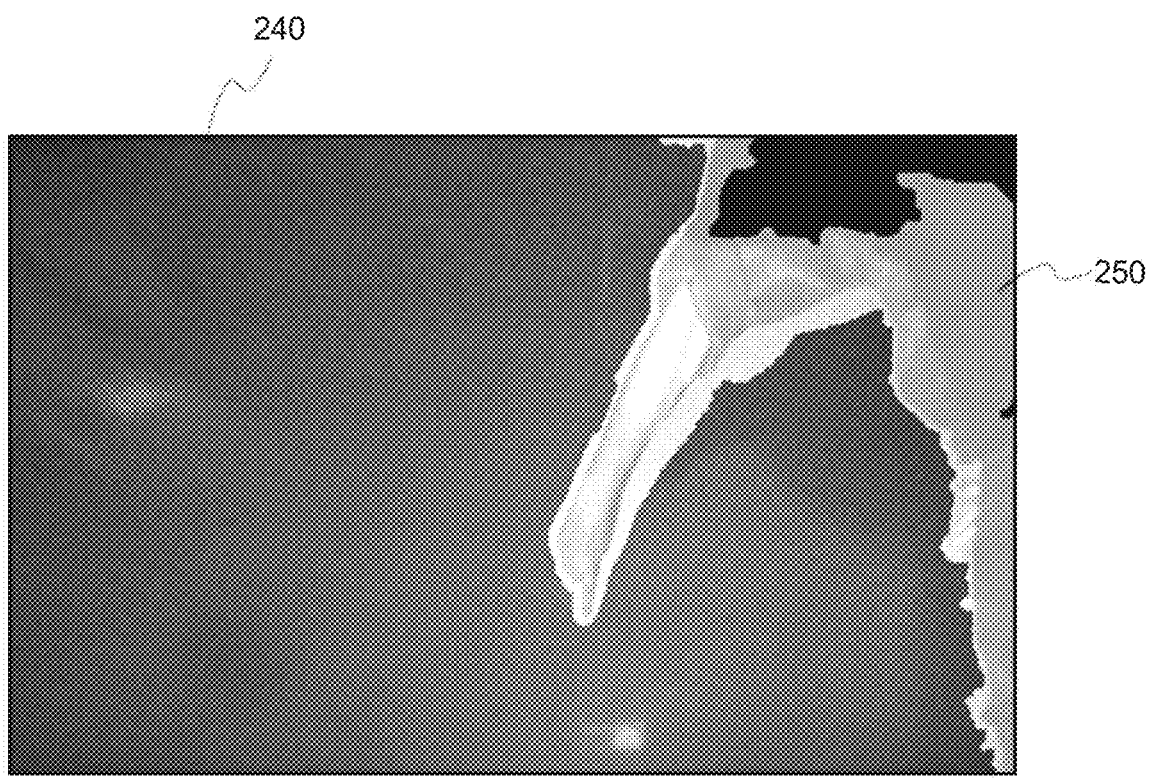
FIG. 12 is a diagram showing a difference image on which morphological transformation has been performed.

FIG. 12 is a diagram showing the difference image 240 on which morphological transformation has been performed.

Then, the position detection section 150 performs the morphological transformation for expansion and contraction on the change area 250 of the difference image 240 to remove the isolated point to perform plugging of a bored area (step S604). FIG. 12 shows the difference image 240 in which the isolated points have been removed, and the bored areas have been plugged.

Figure 13:
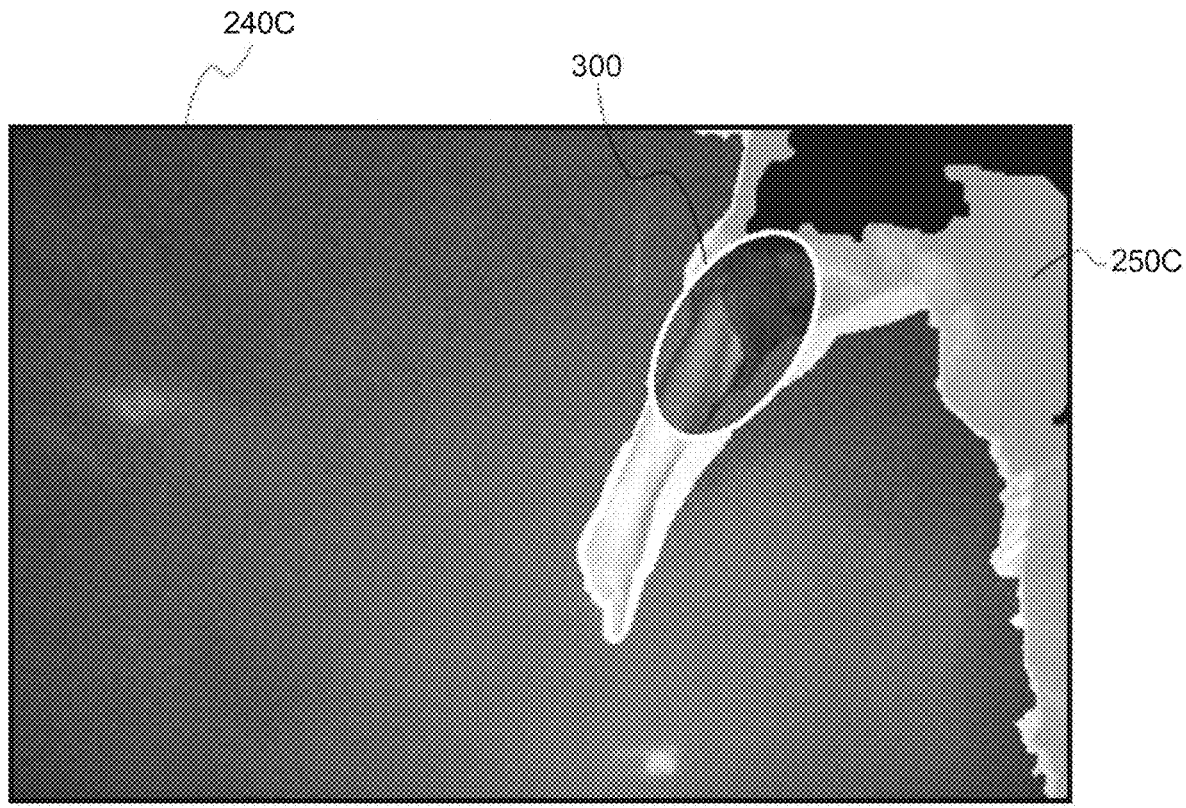
FIG. 13 is a diagram showing a state in which a figure is superimposed on the change area.

FIG. 13 is a diagram showing the state in which a figure 300 is superimposed on a third change area 250C.

Then, the position detection section 150 converts the resolution of the difference image 240 to form (step S605) a difference image 240 ½ in resolution, a difference image ¼ in resolution, and a difference image 240 ⅛ in resolution, respectively. The difference image 240 ⅛ in resolution is described as a third difference image 240C, and the change area 250 displayed in the third difference image 240C is described as the third change area 250C. Further, the difference image 240 ¼ in resolution is described as a second difference image 240B, and the change area 250 displayed in the second difference image 240B is described as a second change area 250B. Further, the difference image 240 ½ in resolution is described as a first difference image 240A, and the change area 250 displayed in the first difference image 240A is described as a first change area 250A.

Figure 14:
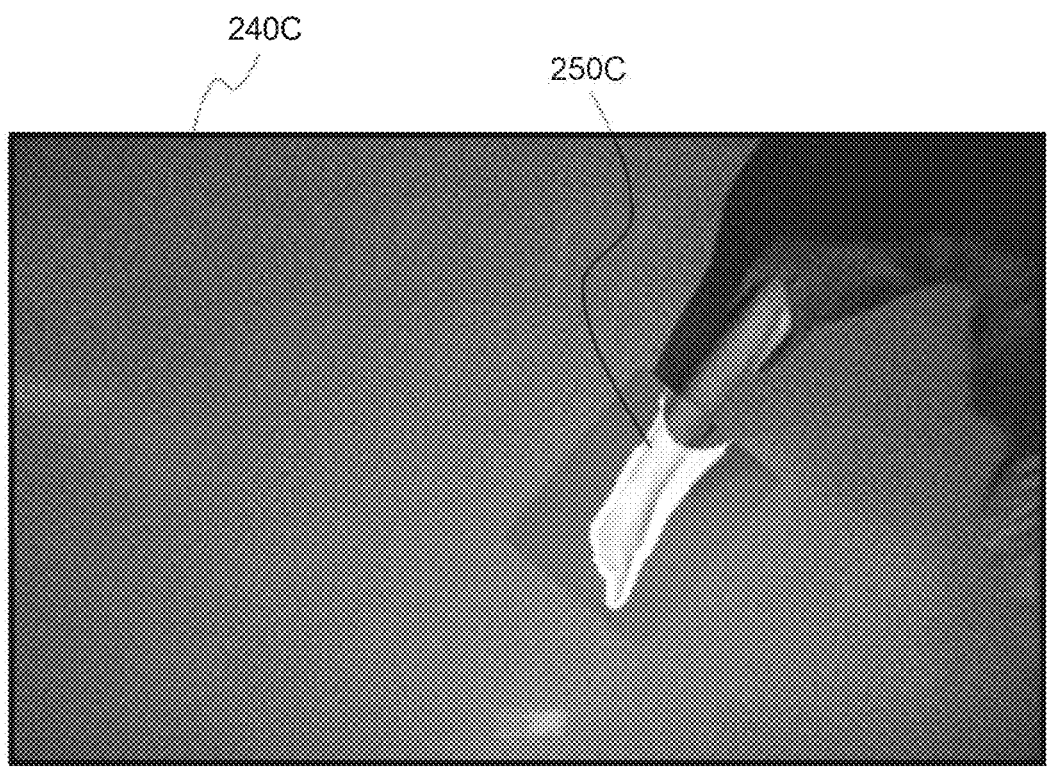
FIG. 14 is a diagram showing a state in which an image in the change area having contact with an outer periphery of the difference image is removed.

Then, the position detection section 150 executes (step S606) a clipping process. The position detection section 150 detects the third change area 250C which the figure 300 having a predetermined size completely fits into while moving the figure 300 on the third difference image 240C ⅛ in resolution. When the tip detection section 163 has detected the third change area 250C which the figure 300 fits into, the tip detection section 167 deletes the image in the third change area 250C on which the figure 300 is superimposed. FIG. 13 shows the state in which the image in the third change area 250C superimposed on the figure 300 is deleted. The position detection section 150 repeats this process until the third change area 250C which the figure 300 fits into no longer exists. Then, the position detection section 150 removes an area having contact with an outer periphery of the third difference image 240C out of the third change area 250C. FIG. 14 is a diagram showing a state in which an image in the third change area 250C having contact with the outer periphery of the third difference image 240C is removed.

Then, the position detection section 150 converts (step S607) the third difference image 240C ⅛ in resolution into one ¼ in resolution. Then, the position detection section 150 calculates (step S608) a logical product of the third difference image 240C having been converted into one ¼ in resolution and the second difference image 240B ¼ in resolution. Thus, there is formed the second difference image 240B which is the second difference image 240B ¼ in resolution, and from which the image removed in the third change area 250C ⅛ in resolution is removed.

Figure 15:
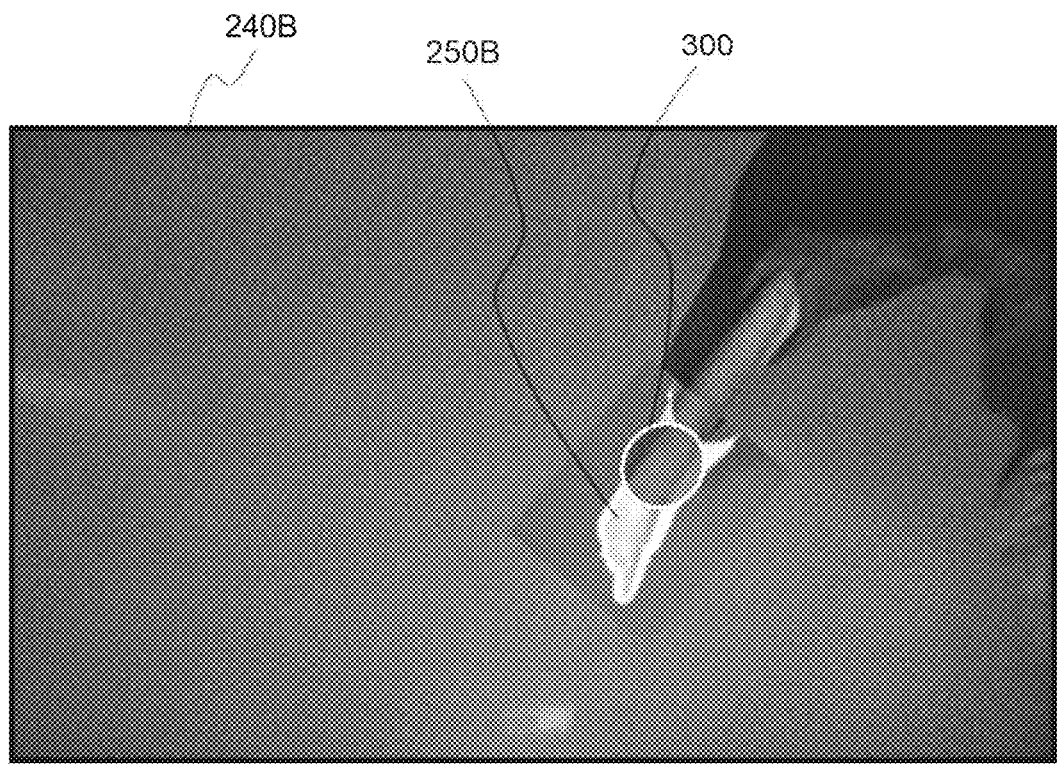
FIG. 15 is a diagram showing a state in which a figure is superimposed on the change area.

FIG. 15 is a diagram showing the state in which the figure 300 is superimposed on the second change area 250B.

Figure 16:
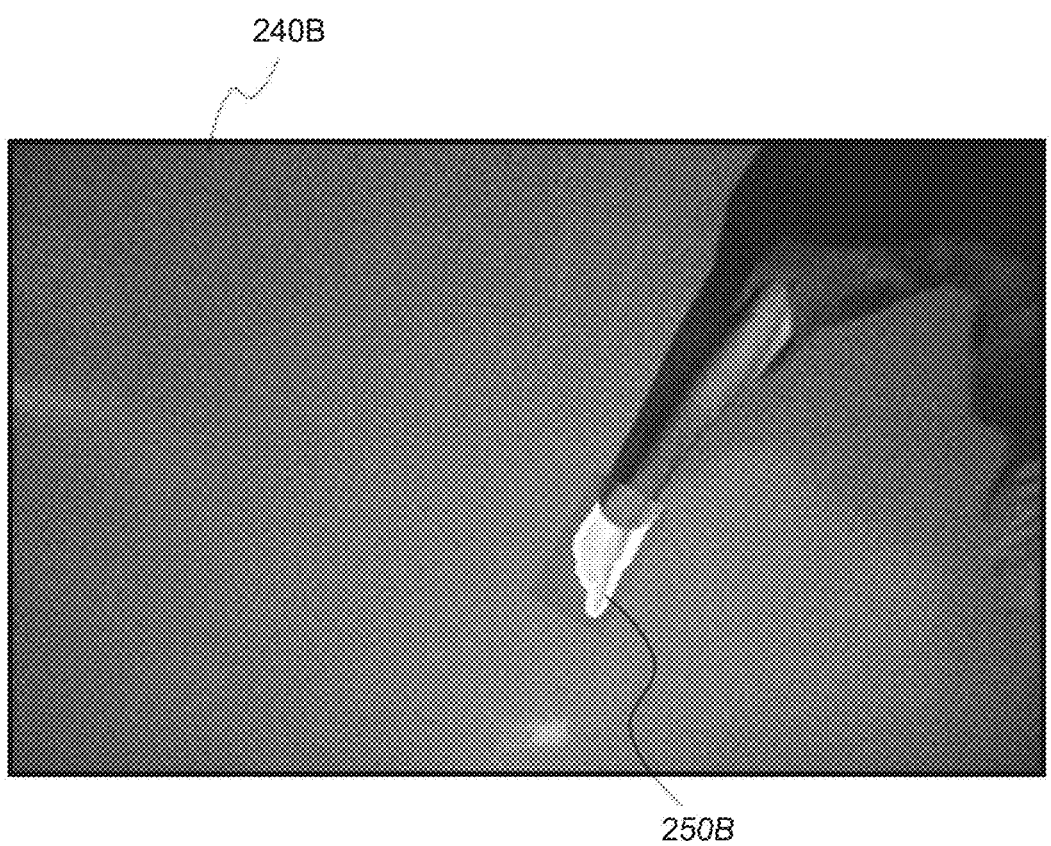
FIG. 16 is a diagram showing a state in which an image in the change area having contact with an outer periphery of the difference image is removed.

Then, the position detection section 150 executes (step S609) a clipping process. The position detection section 150 detects the second change area 250B which the figure 300 completely fits into while moving the figure 300 on the second difference image 240B ¼ in resolution. The size of the figure 300 is the same as the size of the figure 300 used for the removal of the image in the third difference image 240C ⅛ in resolution. When the tip detection section 163 has detected the second change area 250B which the figure 300 fits into, the tip detection section 167 deletes the image in the second change area 250B on which the figure 300 is superimposed. The position detection section 150 repeats this process until the second change area 250B which the figure 300 fits into no longer exists. Then, the position detection section 150 removes an area having contact with an outer periphery of the second difference image 240B out of the second change area 250B. FIG. 16 shows a state in which an image in the second change area 250B having contact with the outer periphery of the second difference image 240B is removed.

Then, the position detection section 150 converts (step S610) the second difference image 240B ¼ in resolution into one ½ in resolution. Then, the position detection section 150 calculates (step S611) a logical product of the second difference image 240B having been converted into one ½ in resolution and the first difference image 240A ½ in resolution. Thus, there is formed the first difference image 240A which is the first difference image 240A ½ in resolution, and from which the image removed in the third change area 250C ⅛ in resolution and the image removed in the second change area 250B ¼ in resolution are removed.

Figure 17:
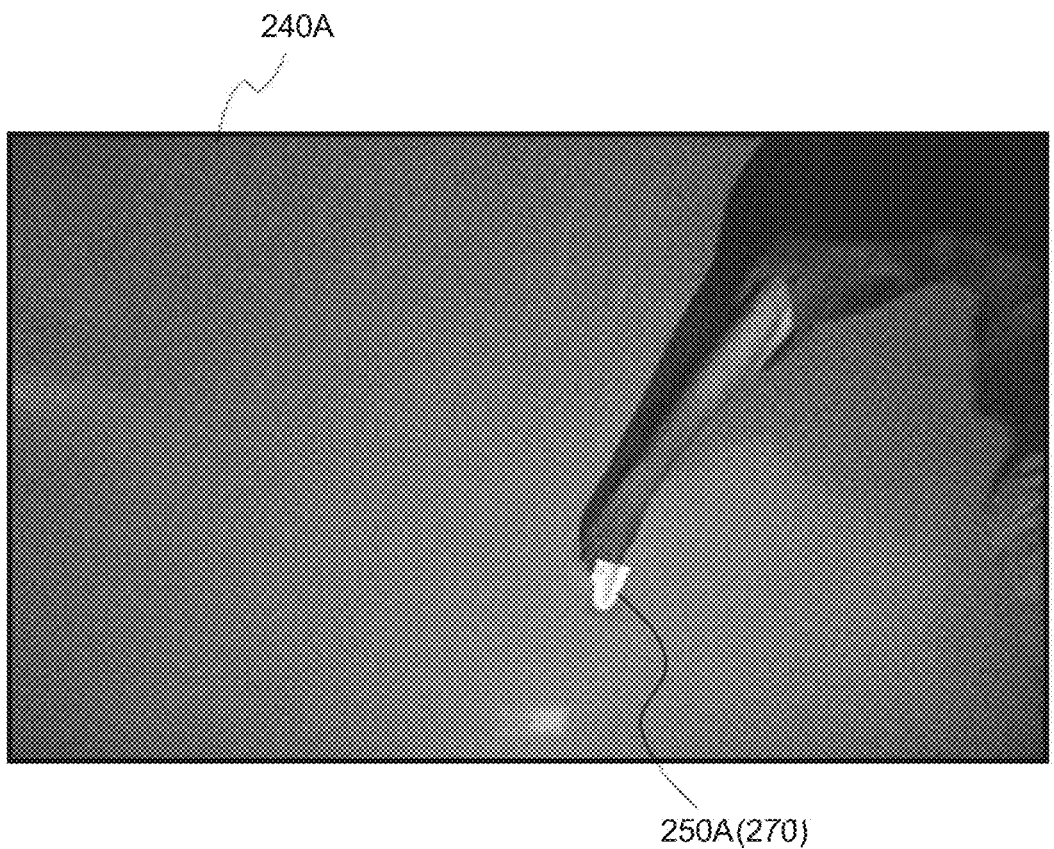
FIG. 17 is a diagram showing a first change area.

FIG. 17 is a diagram showing the first change area 250A.

Figure 18:
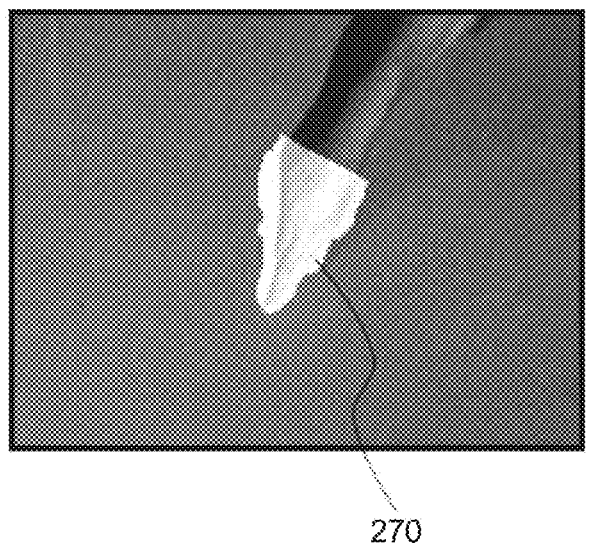
FIG. 18 is a diagram obtained by clipping a specific area centered on the fingertip area from the difference image.

Then, the position detection section 150 executes (step S612) a clipping process. The position detection section 150 detects the first change area 250A which the figure 300 having a predetermined size completely fits into while moving the figure 300 on the first difference image 240A ½ in resolution. The size of the figure 300 is the same as the size of the figure 300 used for the removal of the image in the third difference image 240C ⅛ in resolution and the second difference image 240B ¼ in resolution. When the position detection section 150 has detected the first change area 250A which the figure 300 fits into, the position detection section 150 deletes the image in the first change area 250A on which the figure 300 is superimposed. The position detection section 150 repeats this process until the first change area 250A which the figure 300 fits into no longer exists. The position detection section 150 detects (step S613) the first change area 250A remaining as the fingertip area 270. FIG. 18 is a diagram obtained by clipping a specific area centered on the fingertip area 270 from the difference image 240. Thus, it is possible to detect the fingertip area 270 as an area including the tip of the pointing element 80 having contact with or having approached the operation surface 13 from the whole of the taken image of the operation surface 13 without false detection due to an influence of a noise or the like.

A-6. Identification of Tip Position

Figure 19:
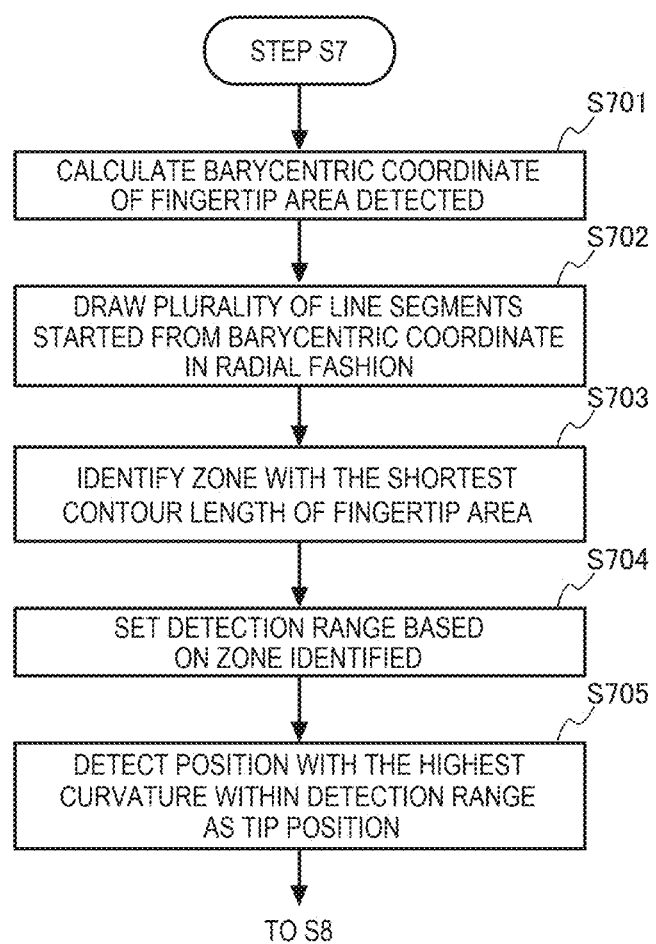
FIG. 19 is a flowchart showing details of a process of identifying a tip position of a finger.
Figure 20:
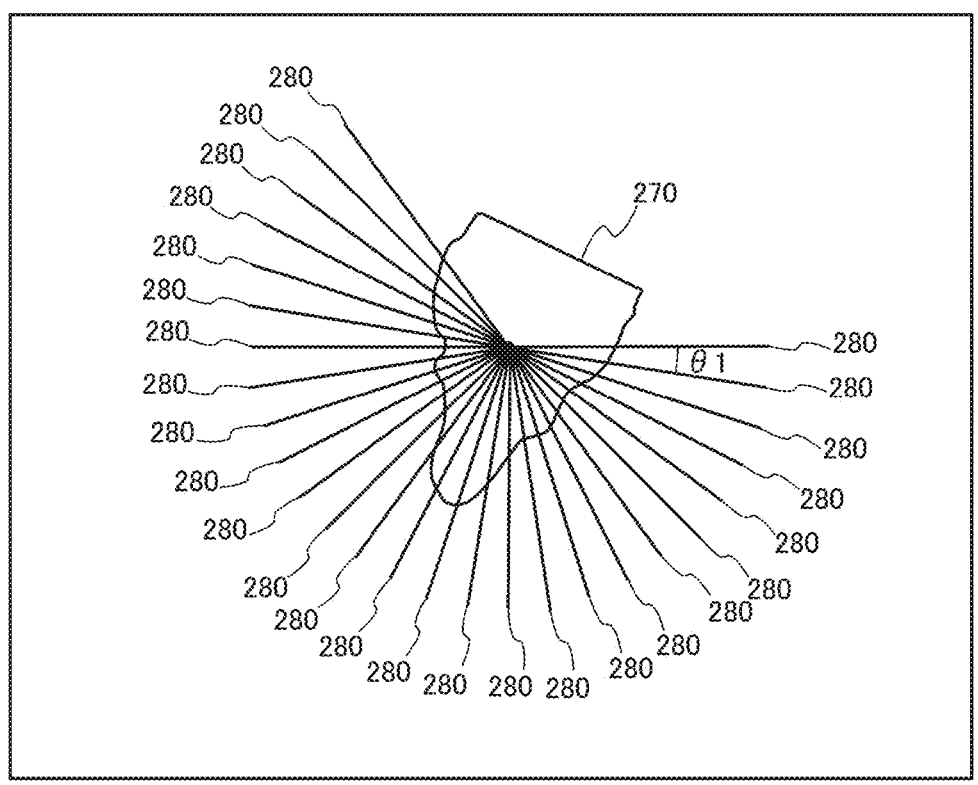
FIG. 20 is a diagram showing line segments drawn in a radial fashion.

FIG. 19 is a flowchart showing the details of a process of identifying the tip position of the finger in the step S7. Further, FIG. 20 is a diagram showing line segments 280 drawn in a radial fashion.

The process of identifying the tip position of the finger will be described with reference to the flowchart shown in FIG. 19.

Firstly, the position detection section 150 calculates (step S701) a barycentric coordinate of the fingertip area 270 detected. When the position detection section 150 has calculated the barycentric coordinate of the fingertip area 270, the position detection section 150 draws (step S702) a plurality of line segments 280 on the first difference image 240A setting the barycentric coordinate of the fingertip area 270 thus calculated as the starting point in a radial fashion centering around the barycentric coordinate. On this occasion, the position detection section 150 draws the plurality of line segments 280 so that the angle θ1 formed between the line segments 280 adjacent to each other becomes constant as shown in FIG. 20.

Figure 21:
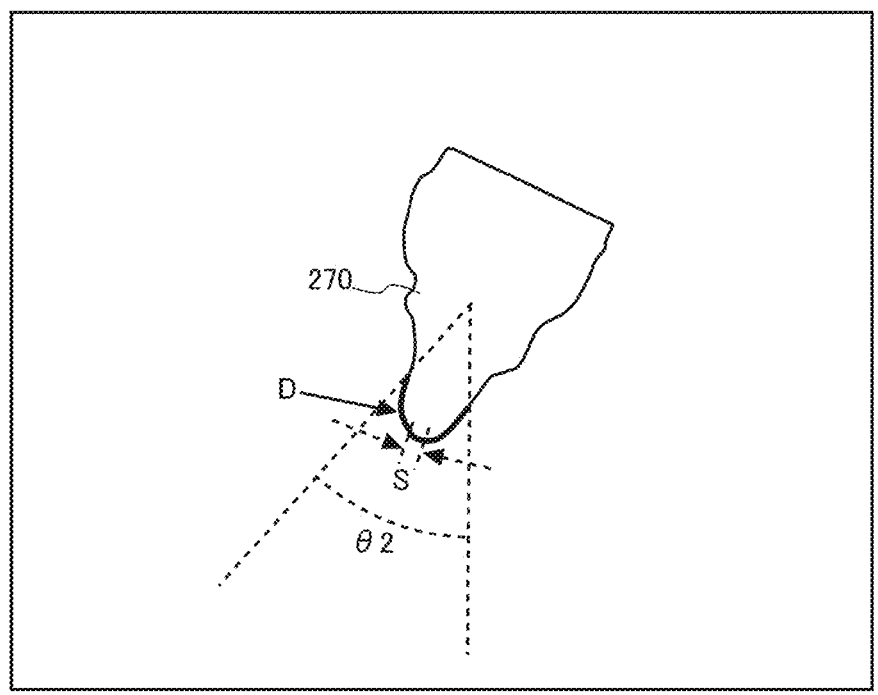
FIG. 21 is a diagram showing a zone in which the length of the contour line is the shortest and a detection range.

FIG. 21 is a diagram showing a zone S in which the length of the contour line is the shortest and a detection range D.

Then, the position detection section 150 calculates the length of the contour line in each of the zones obtained by separating the fingertip area 270 with two line segments 280 adjacent to each other to identify (step S703) the zone in which the length of the contour line thus calculated is the shortest. It is assumed that the zone S shown in FIG. 21 is the zone in which the length of the contour line is the shortest.

Then, the position detection section 150 sets (step S704) the detection range D based on the zone S thus identified. For example, the range of the contour line corresponding to the angle θ2 shown in FIG. 21 corresponds to the detection range D. The detection range D is a range including the zone S and including the both sides of the contour line separated by the zone S.

Figure 22:
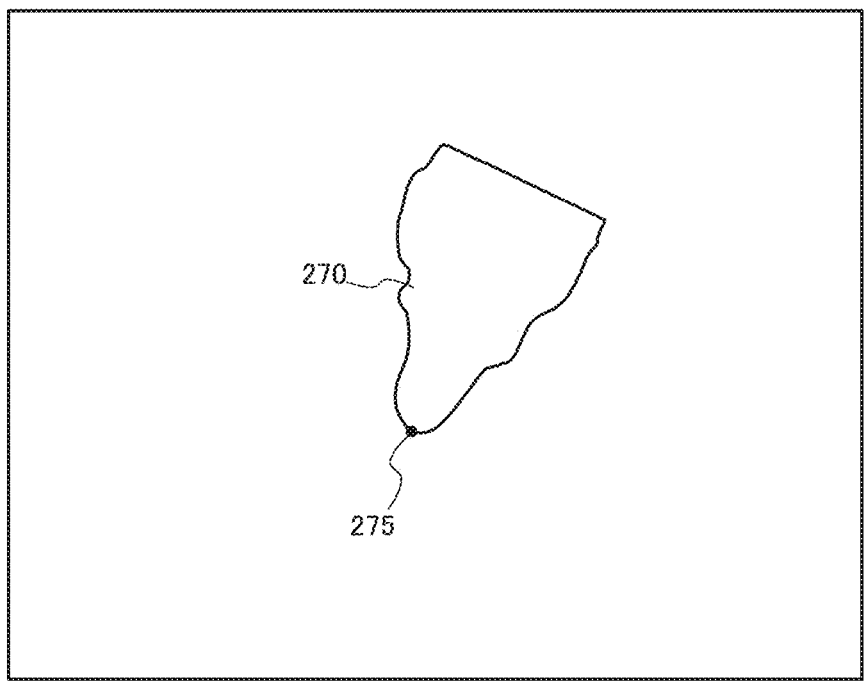
FIG. 22 is a diagram showing a tip position of the fingertip area.

FIG. 22 is a diagram showing the tip position 275 in the fingertip area 270.

Then, the position detection section 150 detects (step S705) the position where the curvature of the fingertip area 270 is the highest within the detection range D thus set. The position detection section 150 determines the position where the curvature is the highest thus detected as the tip position 275.

Figure 23:
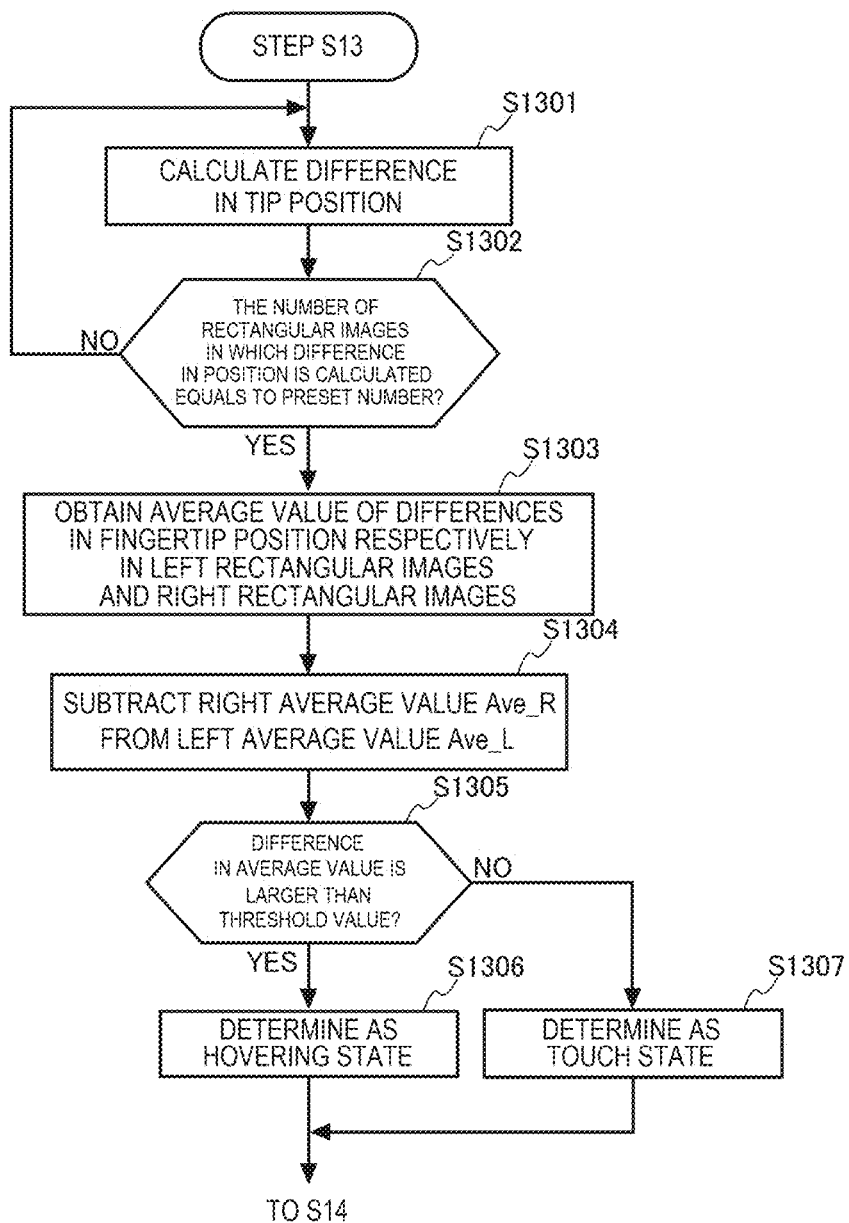
FIG. 23 is a flowchart showing details of the step S13 shown in FIG. 6.

FIG. 23 is a flowchart showing details of the step S13 shown in FIG. 6.

The details of the step S13 shown in FIG. 6 will be described with reference to the flowchart shown in FIG. 23.

In the step S12, the position detection section 150 detects the left tip position 275L of the left rectangular image Lt0, and detects the right tip position 275R of the right rectangular image Rt0 using the template matching. The position detection section 150 calculates (step S1301) the difference in position between the left tip position 275L of the left reference image L0 and the left tip position 275L of the left rectangular image Lt0 input in the step S11. Further, the position detection section 150 calculates (step S1301) the difference in position between the right tip position 275R of the right reference image R0 and the right tip position 275R of the right rectangular image Rt0 input in the step S11. The step S1301 corresponds to the first calculation step and the second calculation step in the present disclosure.

Then, the position detection section 150 determines (step S1302) whether or not the number of the taken images in which the difference in position has been calculated equals to a preset number. The position detection section 150 determines (step S1302) whether or not the number of the taken images in which the difference in position from the left tip position 275L of the left reference image L0 has been calculated equals to the preset number. Similarly, the position detection section 150 determines (step S1302) whether or not the number of the taken images in which the difference in position from the right tip position 275R of the right reference image R0 has been calculated equals to the preset number.

When the number of the left rectangular images 235 fails to equal to the preset number (NO in the step S1302), the position detection section 150 calculates (step S1301) the difference in position from the left tip position 275L of the left reference image L0 targeting at the left rectangular image Lt+1 as the next taken image. Similarly, when the number of the right rectangular images 237 fails to equal to the preset number (NO in the step S1302), the position detection section 150 calculates (step S1301) the difference in position from the right tip position 275R of the right reference image R0 targeting at the right rectangular image Rt+1 as the next taken image.

Further, when the number of the left rectangular images 235 equals to the preset number (YES in the step S1302), namely when the processing of the three images of the left rectangular image Lt0, the left rectangular image Lt+1, and the left rectangular image Lt+2 has been completed, the position detection section 150 makes the transition to the process in the step S1303. Similarly, when the number of the right taken images equals to the preset number (YES in the step S1302), namely when the processing of the three images of the right rectangular image Rt0, the right rectangular image Rt+1, and the right rectangular image Rt+2 has been completed, the position detection section 150 makes the transition to the process in the step S1303.

When the position detection section 150 has respectively calculated the difference in position from the left tip position 275L of the left reference image L0 targeting at the left rectangular image Lt0, the left rectangular image Lt+1, and the left rectangular image Lt+2, the position detection section 150 then calculates (step S1303) an average value of the differences in position thus calculated. The average value thus calculated is described as the left average value Ave_L.

Similarly, when the position detection section 150 has respectively calculated the differences in position from the right tip position 275R of the right reference image R0 targeting at the right rectangular image Rt0, the right rectangular image Rt+1, and the right rectangular image Rt+2, the position detection section 150 calculates (step S1303) the average value of the differences in position thus calculated. The average value thus calculated is described as the right average value Ave_R.

Then, the position detection section 150 subtracts (step S1304) the right average value Ave_R from the left average value Ave_L. The position detection section 150 compares (step S1305) (left average value Ave_L)−(right average value Ave_R) with a threshold value set in advance. When the value of (left average value Ave_L)−(right average value Ave_R) is larger than the threshold value (YES in the step S1305), the position detection section 150 determines (step S1306) the state of the pointing element 80 as the hovering state. Further, when the value of (left average value Ave_L)−(right average value Ave_R) is no larger than the threshold value (NO in the step S1305), the position detection section 150 determines (step S1307) the state of the pointing element 80 as the touch state.

When the position detection section 150 has determined that the pointing element 80 is in the touch state, the position detection section 150 outputs the coordinate information representing the left tip position 275L of the left rectangular image Lt0 and the coordinate information representing the right tip position 275R of the right rectangular image Rt0 to the control section 170. Further, when the position detection section 150 has determined that the pointing element 80 is in the hovering state, the position detection section 150 does not output the coordinate information to the control section 170.

As described hereinabove, the operation detection device 200 according to the present embodiment is provided with the conversion section 162, the touch determination section 164, and the untouched state determination section 166.

The conversion section 162 converts the left taken image and the right taken image obtained by imaging the operation surface 13 from the respective imaging viewpoints different from each other into the images calibrated with respect to the operation surface 13.

The touch determination section 164 determines whether or not the pointing element 80 has contact with the operation surface 13 and is in the resting state based on the images of the pointing element 80 imaged in the left taken images and the right taken images thus converted.

The untouched state determination section 166 selects the left taken image obtained when the untouched state determination section 166 has determined that the pointing element 80 has contact with the operation surface 13 and is in the resting state as the left reference image L0, and then calculates the difference in position between the pointing element 80 imaged in the left reference image L0 thus selected and the pointing element 80 imaged in the left taken image.

Similarly, the untouched state determination section 166 selects the right taken image obtained when the untouched state determination section 166 has determined that the pointing element 80 has contact with the operation surface 13 and is in the resting state as the right reference image R0, and then calculates the difference in position between the pointing element 80 imaged in the right reference image R0 thus selected and the pointing element 80 imaged in the right taken image.

Then, the untouched state determination section 166 determines whether or not the pointing element 80 has been separated from the operation surface 13 based on the difference in position between the pointing element 80 imaged in the left reference image L0 and the pointing element 80 imaged in the left rectangular image 235 and the difference in position between the pointing element 80 imaged in the right reference image R0 and the pointing element 80 imaged in the right rectangular image 237.

The left rectangular image 235 and the right rectangular image 237 are calibrated so that the disparity on the operation surface 13 vanishes. Therefore, by determining whether or not the pointing element 80 has contact with the operation surface 13 based on the disparity in the images of the pointing element 80 imaged in the left rectangular image 235 and the right rectangular image 27, it is possible to increase the accuracy in contact determination.

Further, the taken images in the state in which the pointing element 80 has contact with the operation surface 13 are selected as the left reference image L0 and the right reference image R0, and the image of the pointing element 80 is detected based on the left reference image L0 and the right reference image R0 thus selected. Therefore, it is possible to prevent the detection accuracy from deteriorating due to an influence of a shadow of the pointing element 80 showing up on the operation surface 13. In other words, by detecting the image of the pointing element 80 from the left rectangular image 235 and the right rectangular image 237 based on the left reference image L0 and the right reference image R0, it is possible to increase the detection accuracy of the pointing position of the pointing element 80.

Further, the difference in position between the pointing element 80 imaged in the left reference image L0 and the pointing element 80 imaged in the left rectangular image 235, and the difference in position between the pointing element 80 imaged in the right reference image R0 and the pointing element 80 imaged in the right rectangular image 237 are respectively calculated. Then, whether or not the pointing element 80 has been separated from the operation surface 13 is determined based on these differences in position thus calculated. Therefore, it is possible to accurately determine whether or not the pointing element 80 has been separated from the operation surface 13 based on the disparity occurring between the left taken image and the right taken image. Further, since it is possible to improve the determination accuracy on whether or not the pointing element 80 has been separated from the operation surface 13, it is possible to improve the detection accuracy of the operation with the pointing element 80.

Further, the untouched state determination section 166 calculates the difference in position between the pointing element 80 imaged in each of the plurality of left taken images input sequentially and the pointing element 80 imaged in the left reference image L0, and then calculates the average value of the plurality of differences in position of the pointing element 80 thus calculated as the left average value Ave_L. Similarly, the untouched state determination section 166 calculates the difference in position between the pointing element 80 imaged in each of the plurality of right taken images input sequentially and the pointing element 80 imaged in the right reference image R0, and then calculates the average value of the plurality of differences in position of the pointing element 80 thus calculated as the right average value Ave_R. Then, when the difference between left average value Ave_L and the right average value Ave_R is larger than the threshold value, the untouched state determination section 166 determines that the pointing element 80 has separated from the operation surface 13.

Therefore, it is possible to reduce the influence of the noise and so on to improve the determination accuracy on whether or not the pointing element 80 has separated from the operation surface 13.

The touch determination section 164 determines the contact between the pointing element 80 and the operation surface 13 based on the disparity between the image of the pointing element 80 imaged in the left rectangular image 235 and the image of the pointing element 80 imaged in the right rectangular image 237.

The left rectangular image 235 and the right rectangular image 237 are calibrated so that the disparity on the operation surface 13 vanishes. Therefore, by determining whether or not the pointing element 80 has contact with the operation surface 13 based on the disparity in the images of the pointing element 80 imaged in the left rectangular image 235 and the right rectangular image 27, it is possible to increase the accuracy in contact determination.

Further, the touch determination section 164 determines whether or not a change in position of the image of the pointing element 80 exists among the plurality of left taken images and among the plurality of right taken images, the plurality of left taken images and the plurality of right taken images are taken before the left taken image and the right taken image obtained when it has been determined that the pointing element 80 has had contact with the operation surface 13, to thereby determine whether or not the pointing element 80 is in the resting state.

Therefore, it is possible to reduce the influence of the noise and so on to improve the accuracy of the image to be selected as the reference image.

The embodiment described above is a preferred embodiment of the present disclosure. It should be noted that the present disclosure is not limited to the embodiment, but a variety of modifications can be adopted within the scope or the spirit of the present disclosure.

For example, although in the embodiment described above, there is described the configuration of the operation detection device 200 provided with the position detection section 150 and the control section 170, it is also possible to make the position detection section 150 alone act as the operation detection device 200.

Further, although in the embodiment described above, there is described the configuration in which the projector 100 is provided with the imaging section 120, it is also possible to dispose the imaging section 120 as a separate body from the projector 100. For example, it is also possible to configure the imaging section 120 as an imaging device operating alone, and to couple the imaging device and the projector 100 wirelessly or with wire to each other.

Further, each of the functional sections of the projector 100 shown in FIG. 3 is for showing the functional configuration, and the specific mounting forms are not particularly limited. In other words, it is not necessarily required to install the hardware corresponding individually to each of the functional sections, but it is obviously possible to adopt a configuration of realizing the functions of the plurality of functional sections by a single processor executing a program. Further, a part of the function realized by software in the embodiments described above can also be realized by hardware, and a part of the function realized by hardware can also be realized by software. Besides the above, the specific detailed configuration of each of other sections than the projector can arbitrarily be modified within the scope or the spirit of the present disclosure.

Further, the processing units of the flowcharts shown in FIG. 5, FIG. 6, FIG. 9, FIG. 19, and FIG. 23 are obtained by dividing the process of the projector 100 in accordance with major processing contents in order to make the process of the projector 100 easy to understand. The scope of the present disclosure is not limited by the way of the division or the names of the processing units shown in the flowcharts of FIG. 5, FIG. 6, FIG. 9, FIG. 19, and FIG. 23. Further, the process of the control section 170 and the position detection section 150 can also be divided into a larger number of processing units, or can also be divided so that one processing unit includes a larger amount of process in accordance with the processing contents. Further, the processing sequence of the flowchart described above is not limited to the illustrated example.

Further, when realizing the operation detection method using a computer provided to the projector 100, it is also possible to configure the program to be executed by the computer as an aspect of a recording medium, or an aspect of a transmission medium for transmitting the program. As the recording medium, there can be used a magnetic or optical recording medium, or a semiconductor memory device. Specifically, there can be cited a portable or rigid recording medium such as a flexible disk, an HDD (Hard Disk Drive), a CD-ROM, a DVD, a Blu-ray disc, a magnetooptic disc, a flash memory, or a card-type recording medium. Further, the recording medium described above can also be a RAM, or a nonvolatile storage device such as a ROM or the HDD as an internal storage device provided to the server device. Blu-ray is a registered trademark.

What is claimed is:

1. An operation detection method of detecting an operation of a pointing element with respect to an operation surface, the method comprising:
    converting a first taken image obtained by imaging the operation surface into a first converted taken image calibrated with respect to the operation surface;
    converting a second taken image obtained by imaging the operation surface from an imaging viewpoint different from the first taken image into a second converted taken image calibrated with respect to the operation surface;
    determining whether or not the pointing element contacts with the operation surface and is in a resting state based on an image of the pointing element in the first converted taken image and an image of the pointing element in the second converted taken image;
    selecting the first converted taken image at when it was determined that the pointing element contacts and to be in the resting state as a first reference image;
    calculating a first difference in position between the pointing element in the first reference image and the pointing element in the first converted taken image different from the first reference image, the calculating the first difference includes;
        calculating a plurality of the first differences between the pointing element in each of a plurality of the first converted taken images input sequentially and the pointing element in the first reference image, and
        calculating a first average value of the plurality of first differences,
    selecting the second converted taken image at when it was determined that the pointing element contacts and to be in the resting state as a second reference image;
    calculating a second difference in position between the pointing element in the second reference image selected and the pointing element in the second converted taken image different from the second reference image, the calculating the second difference includes;
        calculating a plurality of the second differences between the pointing element in each of a plurality of the second converted taken images input sequentially and the pointing element in the second reference image, and
        calculating a second average value of the plurality of second differences,
    determining whether or not the pointing element separated from the operation surface based on the first difference and the second difference; and
    determining whether or not the pointing element separated determines that the pointing element separated when a difference between the first average value and the second average value is larger than a threshold value.

2. The operation detection method according to claim 1, wherein
    the determining whether or not the pointing element contacts determines whether or not the pointing element contacts based on a disparity occurring between an image of the pointing element imaged in the first converted taken image and an image of the pointing element imaged in the second converted taken image.

3. The operation detection method according to claim 1, wherein
    the determining whether or not the pointing element is in a resting state determines whether or not the pointing element is in the resting state by
        comparing an image of the pointing element in the first reference image and an image of the pointing element in the second reference image with images of the pointing element imaged in the first taken images and the second taken images taken before the first reference image and the second reference image.

4. An operation detection device comprising:
    a processor configured to execute a program to cause the operation detection device to:
        convert a first taken image obtained by imaging an operation surface into a first converted taken image calibrated with respect to the operation surface,
        convert a second taken image obtained by imaging the operation surface from an imaging viewpoint different from the first taken image into a second converted taken image calibrated with respect to the operation surface,
        determine whether or not a pointing element contacts with the operation surface and is in a resting state based on an image of the pointing element in the first converted taken image and an image of the pointing element in the second converted taken image converted,
        select the first converted taken image at when it was determined that the pointing element contacts and to be in the resting state as a first reference image,
        calculate a first difference in position between the pointing element in the first reference image and the pointing element in the first converted taken image different from the first reference image,
        calculate a plurality of the first differences between the pointing element in each of a plurality of the first converted taken images input sequentially and the pointing element in the first reference image,
        calculate a first average value of the plurality of first differences,
        select the second converted taken image at when it was determined that the pointing element contacts and to be in the resting state as a second reference image,
        calculate a second difference in position between the pointing element in the second reference image and the pointing element in the second converted taken image different from the second reference image,
        calculate a plurality of the second differences between the pointing element in each of a plurality of the second converted taken images input sequentially and the pointing element in the second reference image,
        calculate a second average value of the plurality of second differences,
        determine whether or not the pointing element separated from the operation surface based on the first difference and the second difference, and determine whether or not the pointing element separated determines that the pointing element separated when a difference between the first average value and the second average value is larger than a threshold value.

5. A display system comprising:

a first camera configured to image an operation surface;

a second camera different in imaging viewpoint from the first camera and configured to image an operation surface; and a processor configured to execute a program to cause the display system to:
- convert a first taken image obtained by the first camera into a first converted taken image calibrated with respect to the operation surface;
- convert a second taken image obtained by the second camera into a second converted taken image calibrated with respect to the operation surface,
- determine whether or not the pointing element contacts with the operation surface and is in a resting state based on an image of the pointing element in the first converted taken image and an image of the pointing element in the second converted taken image;
- select the first converted taken image at when it was determined that the pointing element contacts and to be in the resting state as a first reference image,
- calculate a first difference in position between the pointing element in the first reference image and the pointing element in the first converted taken image different from the first reference image,
- calculate a plurality of the first differences between the pointing element in each of a plurality of the first converted taken images input sequentially and the pointing element in the first reference image,
- calculate a first average value of the plurality of first differences,
- select the second converted taken image at when it was determined that the pointing element contacts and to be in the resting state as a second reference image,
- calculate a second difference in position between the pointing element in the second reference image and the pointing element in the second converted taken image different from the second reference image,
- calculate a plurality of the second differences between the pointing element in each of a plurality of the second converted taken images input sequentially and the pointing element in the second reference image,
- calculate a second average value of the plurality of second differences,
- determine whether or not the pointing element separated from the operation surface based on the first difference and the second difference,
- determine whether or not the pointing element separated determines that the pointing element separated when a difference between the first average value and the second average value is larger than a threshold value,
- detect an operation of the pointing element with respect to the operation surface based on a determination result of whether the pointing element is in contact with the operation surface; and a light modulation device configured to display an image corresponding to the operation of the pointing element on the operation surface.

* * * * *